US009861709B2

(12) United States Patent
Janetopoulos et al.

(10) Patent No.: US 9,861,709 B2
(45) Date of Patent: Jan. 9, 2018

(54) OPEN MICROFLUIDIC DEVICES FOR CHEMOTAXIS, METHODS OF USING SAME, AND APPLICATIONS OF SAME

(71) Applicants: Christopher Janetopoulos, Nashville, TN (US); Gus Wright, Nashville, TN (US); William Hudson Hofmeister, Nashville, TN (US); Jose Lino Vasconcelos da Costa, Tullahoma, TN (US); Alexander Terekhov, Estill Springs, TN (US)

(72) Inventors: Christopher Janetopoulos, Nashville, TN (US); Gus Wright, Nashville, TN (US); William Hudson Hofmeister, Nashville, TN (US); Jose Lino Vasconcelos da Costa, Tullahoma, TN (US); Alexander Terekhov, Estill Springs, TN (US)

( * ) Notice: Subject to any disclaimer, the term of this patent is extended or adjusted under 35 U.S.C. 154(b) by 203 days.

(21) Appl. No.: 14/254,228

(22) Filed: Apr. 16, 2014

(65) Prior Publication Data

US 2014/0308207 A1  Oct. 16, 2014

Related U.S. Application Data

(60) Provisional application No. 61/812,627, filed on Apr. 16, 2013.

(51) Int. Cl.
*G01N 33/00* (2006.01)
*A61K 49/00* (2006.01)
(Continued)

(52) U.S. Cl.
CPC ............ *A61K 49/00* (2013.01); *B01L 3/5027* (2013.01); *G01N 33/5029* (2013.01);
(Continued)

(58) Field of Classification Search
CPC ................ A61K 49/00; G01N 33/5029; B01L 2200/0694
See application file for complete search history.

(56) References Cited

U.S. PATENT DOCUMENTS 8,647,861 B2 * 2/2014 Ingber ................. C12N 5/0696
435/283.1
2010/0151465 A1 * 6/2010 Ju ........................ C12Q 1/6816
435/6.12

(Continued)

*Primary Examiner* — Sam P Siefke
(74) *Attorney, Agent, or Firm* — Patrick J. Halloran

(57) ABSTRACT

In one aspect, an on-chip microfluidic device (OMD) is provided for microscopic observation. In one embodiment, an on-chip gradient generating device has a silica chip having a cell loading portion configured to load the tissue. A microfluidic channel is formed in the silica chip for a chemoattractant solution having the chemoattractant to flow through, and a plurality of gradient generating ports is formed to connect to the microfluidic channel to the cell loading portion. A chemoattractant supply device is connected to an inlet of the at least one microfluidic channel for supplying the chemoattractant with a constant positive pressure to the chemoattractant solution flowing in the microfluidic channel to create the passive gradient of the chemoattractant in the chemoattractant solution such that the tissue is exposed to the chemoattractant solution having different concentration of the chemoattractant at each gradient generating port.

15 Claims, 24 Drawing Sheets

(51) Int. Cl.
*G01N 33/50* (2006.01)
*B01L 3/00* (2006.01)
(52) U.S. Cl.
CPC .................. *B01L 2200/0694* (2013.01); *B01L 2300/0877* (2013.01); *B01L 2400/0487* (2013.01)

(56) References Cited

U.S. PATENT DOCUMENTS

2012/0135446 A1* 5/2012 Collins ............. B01L 3/502776
 435/29
2013/0059322 A1* 3/2013 Hung .................... C12M 23/12
 435/29
2013/0068310 A1* 3/2013 Sip ............................ F17D 1/00
 137/1

* cited by examiner

OPEN MICROFLUIDIC DEVICES FOR CHEMOTAXIS, METHODS OF USING SAME, AND APPLICATIONS OF SAME

CROSS-REFERENCE TO RELATED PATENT APPLICATIONS

This application claims priority to and the benefit of, pursuant to 35 U.S.C. §119(e), U.S. provisional patent application Ser. No. 61/812,627, filed Apr. 16, 2013, entitled "MICROFLUIDIC DEVICES FOR CHEMOTAXIS, METHODS OF MAKING SAME, AND APPLICATIONS OF SAME," by Christopher Janetopoulos, Gus Wright, William Hofmeister, Jose Lino Vasconcelos da Costa and Alexander Terekhov, which is incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to microfluidic devices, and more particularly, to an on-chip open microfluidic device (OMD) using an on-chip gradient generating device for chemotaxis studies, methods of using the same, and application of the same.

BACKGROUND OF THE INVENTION

The background description provided herein is for the purpose of generally presenting the context of the present invention. Work of the presently named inventors, to the extent it is described in this background section, as well as aspects of the description that may not otherwise qualify as prior art at the time of filing, are neither expressly nor impliedly admitted as prior art against the present invention.

Chemotaxis is the ability of cells to sense a chemical gradient and respond by migrating directionally towards or away from the source. Chemotaxis is critical to cell development, wound healing and a plethora of illnesses including cancer and autoimmune diseases. (Condeelis, et al., 2005; De Paepe, et al., 2009; Dorsam & Gutkind, 2007; Hansson, 2009; Johnson, et al., 2004; Lazennec & Richmond, 2010; Wu, et al., 2009.) The study of chemotaxis typically requires the experimenter to provide a gradient to the cells on a microscopic platform so various characteristics of the cell can be observed and quantified. Since cells have a remarkable ability to detect small changes in receptor occupancy (~5% difference) across the length of the cell, it is critical that gradients remain stable and quantifiable. (Lauffenburger, et al., 1983; Postma & van Haastert, 2009.) Classically, chemical gradients have been created using a micropipette assay. (Bunning, 1989.) A micropipette with a one micron-sized opening at the tip is used in conjunction with a micromanipulator and a pump to create a diffusive radial gradient within a one-well chamber on an inverted microscope. (Bunning, 1989; Parent, et al., 1998.) Cells detect this passive diffusion gradient and migrate across the glass surface of the one-well chamber toward the micropipette source. Other devices have been created for measuring chemotaxis using diffusive gradients and include the Boyden chamber, Zigmond chamber, and the Dunn chamber, with the latter two being compatible with microscopic observation. (Boyden, 1962; Zicha D., 1997; Zigmond, 1977.) While these devices are useful for determining qualitative differences over short time scales, these platforms also produce linear gradients that change over time, lack stability and are difficult to manipulate.

Therefore, a heretofore unaddressed need exists in the art to address the aforementioned deficiencies and inadequacies.

SUMMARY OF THE INVENTION

In one aspect, the present invention relates to an on-chip open microfluidic device (OMD), which includes (a) a substrate, (b) an on-chip gradient generating device for generating a passive gradient of a chemoattractant for a tissue, and (c) an imaging device configured to capture an image of the tissue to observe cell migration of the tissue. In one embodiment, the on-chip gradient generating device includes: (i) a first polydimethyl-siloxane (PDMS) coating layer disposed on the substrate; (ii) a silica ($SiO_2$) chip positioned within a distance from the first PDMS coating layer and has a cell loading portion configured to load the tissue, where a microfluidic channel is formed between the silica chip and the PDMS coating layer for a chemoattractant solution having the chemoattractant to flow through, and a plurality of gradient generating ports is formed to connect the microfluidic channel to the cell loading portion such that the tissue loaded by the cell loading portion is exposed to the chemoattractant solution through each of the plurality of gradient generating ports; (iii) an inlet connected to the microfluidic channel for flowing the chemoattractant solution into the microfluidic channel; and (iv) a chemoattractant supply device connected to the inlet for supplying the chemoattractant with a constant positive pressure to the chemoattractant solution flowing into the microfluidic channel to create the passive gradient of the chemoattractant in the chemoattractant solution such that the tissue is exposed to the fluid having different concentration of the chemoattractant at each of the plurality of gradient generating ports.

In one embodiment, the on-chip gradient generating device further includes an outlet connected to the microfluidic channel for flowing the chemoattractant solution out from the microfluidic channel.

In one embodiment, the chemoattractant is cyclic adenosine monophosphate (cAMP).

In one embodiment, the first PDMS coating layer has a thickness of about 20 μm, and the silica chip has a thickness of about 500 μm.

In certain embodiments, each of the gradient generating ports has a size of about 2.0 to 18.0 μm.

In certain embodiments, each of the gradient generating ports extends along a direction substantially perpendicular to the microfluidic channel. In certain embodiments, each of the gradient generating ports extends along a direction substantially parallel to the microfluidic channel.

In one embodiment, the imaging device includes an objective lens.

In certain embodiments, the tissue includes body tissues in or on a living object. In one embodiment, the tissue includes brain tissues of the living object. In one embodiment, the tissue includes *Dictyostelium discoideum* amoebae. In certain embodiments, the tissue includes resected tissues of a living object.

Another aspect of the present invention relates to an on-chip gradient generating device for generating a passive gradient of a chemoattractant for a tissue. In one embodiment, the on-chip gradient generating device includes: (a) a silica chip having a cell loading portion configured to load the tissue and a plurality of gradient generating ports, where at least one microfluidic channel is formed in the silica chip for a chemoattractant solution having the chemoattractant to flow through, and for each of the at least one microfluidic channel, a plurality of gradient generating ports is formed to connect to the corresponding microfluidic channel to the cell loading portion such that the tissue loaded by the cell loading portion is exposed to the chemoattractant solution through each of the plurality of gradient generating ports; and (b) at least one chemoattractant supply device connected to an inlet of the at least one microfluidic channel for supplying the chemoattractant with a constant positive pressure to the chemoattractant solution flowing in the at least one microfluidic channel to create the passive gradient of the chemoattractant in the chemoattractant solution such that the tissue is exposed to the chemoattractant solution having different concentration of the chemoattractant at each of the plurality of gradient generating ports.

In one embodiment, the chemoattractant is cyclic adenosine monophosphate (cAMP).

In certain embodiments, the silica chip includes: (i) a first polydimethyl-siloxane (PDMS) coating layer; (ii) a silica structure positioned within a distance from the first PDMS coating layer and has the cell loading portion to load the tissue, where the at least one microfluidic channel is formed between the silica structure and the PDMS coating layer for the chemoattractant solution to flow through, and the gradient generating ports are formed within the silica structure to connect the at least one microfluidic channel to the cell loading portion; and (iii) the inlet connected to the at least one microfluidic channel for flowing the chemoattractant solution into the at least one microfluidic channel.

In one embodiment, the first PDMS coating layer has a thickness of about 20 $\mu$m, and the silica chip has a thickness of about 500 $\mu$m.

In one embodiment, the silica chip further includes an outlet connected to the microfluidic channel for flowing the chemoattractant solution out from the at least one microfluidic channel.

In certain embodiments, the on-chip gradient generating device further includes an imaging device configured to capture an image of the tissue to observe cell migration of the tissue. In one embodiment, the imaging device includes an objective lens.

In certain embodiments, each of the gradient generating ports has a size of about 2.0 to 18.0 $\mu$m.

In certain embodiments, each of the gradient generating ports extends along a direction substantially perpendicular to the microfluidic channel. In certain embodiments, each of the gradient generating ports extends along a direction substantially parallel to the microfluidic channel.

In certain embodiments, the tissue includes body tissues in or on a living object. In one embodiment, the tissue includes brain tissues of the living object. In one embodiment, the tissue includes *Dictyostelium discoideum* amoebae. In certain embodiments, the tissue includes resected tissues of a living object.

In a further aspect of the present invention, an on-chip device for providing a chemical to a tissue includes: (a) means for providing a chemical solution and delivering the chemical to the tissue, wherein chemical solution exists in the means, and the tissue is exposed to the chemical solution through a plurality of ports connected to the chemical solution; and (b) means for supplying the chemoattractant with a constant positive pressure to the chemical solution to create the passive gradient of the chemical in the chemical solution such that the tissue is exposed to the chemical solution having different concentration of the chemoattractant at each of the plurality of ports.

In certain embodiments, the chemical is a drug, a fluorescent dye, an indicator, an optogenetic sensor, or a pathogen.

In one embodiment, the chemical is a chemoattractant, the chemical solution is a chemoattractant solution, and the ports are gradient generating ports. In one embodiment, the chemoattractant is cyclic adenosine monophosphate (cAMP).

In certain embodiments, the means for providing the chemoattractant solution to the tissue includes at least one microfluidic channel for flowing the chemoattractant solution through the means, where the at least one microfluidic channel is connected to each of the gradient generating ports.

In one embodiment, the means for providing the chemoattractant solution to the tissue comprises a plurality of nanopores etched therein, where the chemoattractant is deposited in the nanopores In certain embodiments, each of the gradient generating ports extends along a direction substantially perpendicular to the microfluidic channel. In certain embodiments, each of the gradient generating ports extends along a direction substantially parallel to the microfluidic channel.

In certain embodiments, each of the gradient generating ports has a size of about 2.0 to 18.0 $\mu$m.

In certain embodiments, the on-chip gradient generating device further includes means for capturing an image of the tissue to observe cell migration of the tissue. In one embodiment, the means for capturing the image includes an objective lens.

In certain embodiments, the tissue includes body tissues in or on a living object. In certain embodiments, the tissue includes resected tissues of a living object.

In a further aspect, the present invention relates to an on-chip OMD, which includes a substrate and an on-chip gradient generating device disposed on the substrate as claimed above.

In yet another aspect of the present invention, a chemotaxis apparatus includes an on-chip OMD or an on-chip gradient generating device as claimed above. In certain embodiments, the chemotaxis apparatus is a high throughput (HTP) chemotaxis device for screening of drugs, ligands, orphan receptors and mutants.

A further aspect of the present invention relates to a method of detecting cell migration of a tissue due to a passive gradient of a chemoattractant. In one embodiment, the method includes: (a) disposing the tissue to a cell loading portion of a silica ($SiO_2$) chip of an on-chip open microfluidic device (OMD), where the silica chip has a microfluidic channel for a chemoattractant solution having the chemoattractant to flow through, and a plurality of gradient generating ports connecting the microfluidic channel to the cell loading portion; (b) supplying the chemoattractant solution to the microfluidic channel such that the tissue loaded by the cell loading portion is exposed to the chemoattractant solution through each of the plurality of gradient generating ports; and (c) supplying the chemoattractant with a constant positive pressure to the chemoattractant solution flowing in the microfluidic channel to create the passive gradient such that the tissue is exposed to the chemoattractant solution having different concentration of the chemoattractant at each of the plurality of gradient generating ports.

In certain embodiments, the method further includes: capturing an image of the tissue by an imaging device to observe the cell migration of the tissue. In one embodiment, the imaging device includes an objective lens.

In certain embodiments, each of the gradient generating ports extends along a direction substantially perpendicular to the microfluidic channel. In certain embodiments, each of the gradient generating ports extends along a direction substantially parallel to the microfluidic channel.

In certain embodiments, each of the gradient generating ports has a size of about 2.0 to 18.0 μm.

In certain embodiments, the tissue includes body tissues in or on a living object. In certain embodiments, the tissue includes resected tissues of a living object.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1A:
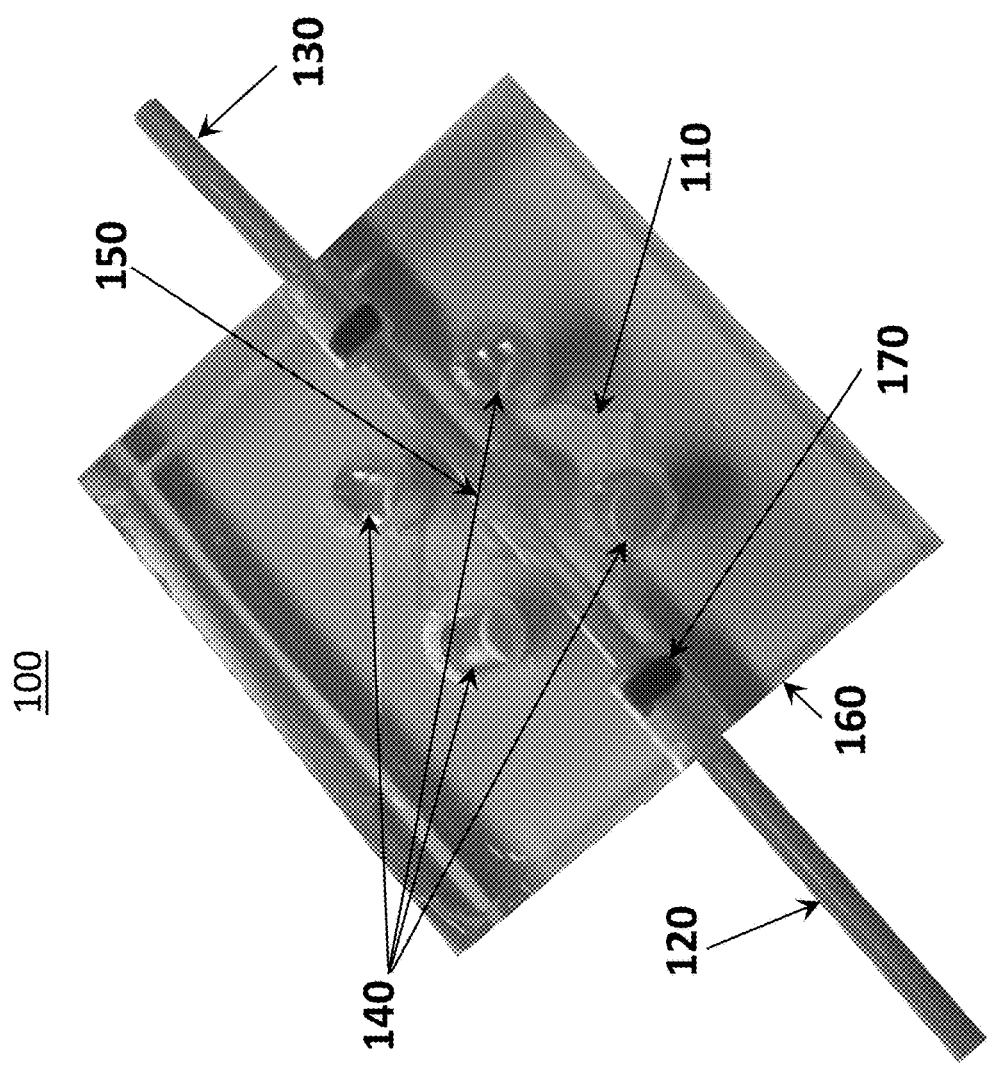
FIG. 1A schematically shows a four-sided bulk silica gradient generating device according to one embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower" can, therefore, encompass both an orientation of "lower" and "upper", depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

The description is now made as to the embodiments of the invention in conjunction with the accompanying drawings. Although various exemplary embodiments of the present invention disclosed herein may be described in the context of fuel cells, it should be appreciated that aspects of the present invention disclosed herein are not limited to being used in connection with one particular type of an open microfluidic device (OMD) and may be practiced in connection with other types of microfluidic devices without departing from the scope of the present invention disclosed herein.

The adaptation of microfluidics in biology has spurred many groups to make use of devices containing microchannels to create stable gradients. (Andersson & van den Berg, 2003; El-Ali, et al., 2006; Young E, 2010.) Microfluidic gradient-generating devices such as hydrogel, polydimethyl-siloxane (PDMS) devices (Kim, 2010; Raja, et al., 2010), and serpentine channel devices(Keenan & Folch, 2008; Melin & Quake, 2007; Whitesides, 2006; Young E, 2010) have given researchers added tools to understand gradient sensing mechanisms in more detail and in three dimensions. (Cukierman, et al., 2001; Hegerfeldt, et al., 2002; Knight, et al., 2000; Wolf, et al., 2003.) Although the small size and three-dimensional environment of these microfluidic devices are advantageous, the active mixing and constant fluid flow can introduce air bubbles, introduce shear and drag forces, and cause variations in the gradient if there are obstructions in the device. (Keenan & Folch, 2008; Walker G M, 2005.) Additionally, placement of cells within these devices is difficult because the systems are typically closed. Cell loading in the closed devices are usually performed by pumping cells through a microfluidic port.

Recently, open microfluidic devices (OMDs) have come on the scene and eliminate many of the problems associated with traditional closed microfluidic devices described above. These "open" platforms can provide spatial and temporal control over a reproducible chemical environment for chemotaxis and have been created to have multiple analysis capabilities, including the ability to stain cells, and analyze 1 protein and gene expression. (Keenan et al., Li et al. Lovchik et al., Dimov et al.) This type of OMD apparatus typically has no ceiling above the cell port and thus provides easy access for cell loading using a standard pipette and can also allow for the setting up of chemical gradients by a micropipette and micromanipulator system. (Jowhar, et al., 2010.) For *Dictyostelium discoideum* amoebae, cell loading is accomplished in the absence of a matrix and several minutes before performing chemotaxis assays. With this type of OMD it is trivial to lay down a matrix. All excess matrix and air bubbles can be easily flushed out with a pipette prior to cell loading. As this assay suggests, PDMS devices can be quite useful but are generally difficult to reuse and are optically inferior to glass, which limits their function for high and super-resolution microscopy. Furthermore, it is difficult to create three dimensional (3D) channels using PDMS and virtually impossible to make channels with features smaller than a few microns.

In addition to the mechanical constraints researchers encounter while performing migration assays, most labs are limited in their ability to access micromanipulation equipment for gradient generation as is commonly performed in many chemotaxis labs. To alleviate this problem, the inventors have created open passive gradient generators in a bulk-fused $SiO_2$ (silica) chip that could be used alone or assembled in tandem with PDMS or other fused silica migration devices. Fused silica has excellent optical properties, will not auto-fluorescence at visible wavelengths, and can be machined by a femtosecond laser. Recent advances in laser etching technologies make this technology possible. (Grill, et al., 2003; Ke, et al., 2005; Kim, et al., 2009.) Channels and holes smaller than 200 nanometers have been demonstrated. (White, 1 et al., 2008.) Unlike PDMS, glass is also very rigid. This means that the channels will not have capacitance. Increases or decreases in pressure will result in precise and rapid changes in fluid flow or gradient manipulation. An on-chip OMD device for chemotaxis assays can be mass-produced, is easy to use, and can provide stable gradients for highly quantitative experimentation.

In one aspect, the present invention relates to an on-chip open microfluidic device (OMD), which includes (a) a substrate, (b) an on-chip gradient generating device for generating a passive gradient of a chemoattractant for a tissue, and (c) an imaging device configured to capture an image of the tissue to observe cell migration of the tissue. In one embodiment, the on-chip gradient generating device includes: (i) a first polydimethyl-siloxane (PDMS) coating layer disposed on the substrate; (ii) a silica ($SiO_2$) chip positioned within a distance from the first PDMS coating layer and has a cell loading portion configured to load the tissue, where a microfluidic channel is formed between the silica chip and the PDMS coating layer for a chemoattractant solution having the chemoattractant to flow through, and a plurality of gradient generating ports is formed to connect the microfluidic channel to the cell loading portion such that the tissue loaded by the cell loading portion is exposed to the chemoattractant solution through each of the plurality of gradient generating ports; (iii) an inlet connected to the microfluidic channel for flowing the chemoattractant solution into the microfluidic channel; and (iv) a chemoattractant supply device connected to the inlet for supplying the chemoattractant with a constant positive pressure to the chemoattractant solution flowing into the microfluidic channel to create the passive gradient of the chemoattractant in the chemoattractant solution such that the tissue is exposed to the fluid having different concentration of the chemoattractant at each of the plurality of gradient generating ports.

Another aspect of the present invention relates to an on-chip gradient generating device for generating a passive gradient of a chemoattractant for a tissue. In one embodiment, the on-chip gradient generating device includes: (a) a silica chip having a cell loading portion configured to load the tissue and a plurality of gradient generating ports, where at least one microfluidic channel is formed in the silica chip for a chemoattractant solution having the chemoattractant to flow through, and for each of the at least one microfluidic channel, a plurality of gradient generating ports is formed to connect to the corresponding microfluidic channel to the cell loading portion such that the tissue loaded by the cell loading portion is exposed to the chemoattractant solution through each of the plurality of gradient generating ports; and (b) at least one chemoattractant supply device connected to an inlet of the at least one microfluidic channel for supplying the chemoattractant with a constant positive pressure to the chemoattractant solution flowing in the at least one microfluidic channel to create the passive gradient of the chemoattractant in the chemoattractant solution such that the tissue is exposed to the chemoattractant solution having different concentration of the chemoattractant at each of the plurality of gradient generating ports.

In a further aspect of the present invention, an on-chip device for providing a chemical to a tissue includes: (a) means for providing a chemical solution and delivering the chemical to the tissue, wherein chemical solution exists in the means, and the tissue is exposed to the chemical solution through a plurality of ports connected to the chemical solution; and (b) means for supplying the chemoattractant with a constant positive pressure to the chemical solution to create the passive gradient of the chemical in the chemical solution such that the tissue is exposed to the chemical solution having different concentration of the chemoattractant at each of the plurality of ports. In certain embodiments, the chemical is a drug, a fluorescent dye, an indicator, an optogenetic sensor, or a pathogen. In one embodiment, the chemical is a chemoattractant, the chemical solution is a chemoattractant solution, and the ports are gradient generating ports. In one embodiment, the chemoattractant is cyclic adenosine monophosphate (cAMP).

A further aspect of the present invention relates to a method of detecting cell migration of a tissue due to a passive gradient of a chemoattractant. In one embodiment, the method includes: (a) disposing the tissue to a cell loading portion of a silica ($SiO_2$) chip of an on-chip open microfluidic device (OMD), where the silica chip has a microfluidic channel for a chemoattractant solution having the chemoattractant to flow through, and a plurality of gradient generating ports connecting the microfluidic channel to the cell loading portion; (b) supplying the chemoattractant solution to the microfluidic channel such that the tissue loaded by the cell loading portion is exposed to the chemoattractant solution through each of the plurality of gradient generating ports; and (c) supplying the chemoattractant with a constant positive pressure to the chemoattractant solution flowing in the microfluidic channel to create the passive gradient such that the tissue is exposed to the chemoattractant solution having different concentration of the chemoattractant at each of the plurality of gradient generating ports.

In one embodiment, the chemoattractant may be cAMP. In certain embodiments, the chemoattractant may be any ligand or chemical that elicits a cell to move directionally. In certain embodiment, the chemoattractant may also be a chemorepellant.

In certain embodiments, the chemoattractant may be replaced by other chemicals. For example, the chemicals may be drugs, fluorescent dyes and indicators, and optogenetic sensors in real time while the organism is under microscopic observation. In one embodiment, pathogens may be added in real time to watch immune response. In one embodiment, effluent may be collected in all of these studies to measure the animals responses to the chemicals being added. This would be the most useful in e.g., mass spectrometry analysis.

In certain embodiments, the inventor provides a plurality of reusable on-chip OMDs that elicit passive chemoattractant gradients. Each on-chip platform has unique features for defined experimentation. In one embodiment, a first device was created in bulk fused silica, was bonded to a cover slip, and was used on an inverted microscope. In certain embodiments, the OMD platforms may have gradient generators incorporated into fused silica where the thickness of the device itself is on the order of a microscope cover slip (100-200 µms). Thus, gradients can be elicited from the cover slip upon which the cells are crawling. In certain embodiments, the cover slip-sized devices may be useful for an inverted microscope or could be used on both an upright and inverted microscope. Certain embodiments of the devices may be proof of concept devices for chemotaxis platforms that can be used for drug discovery and intravital imaging. In the following examples, *D. discoideum* cells were imaged using bright-field and fluorescence microscopy and exhibited robust chemotaxis towards cyclic adenosine monophosphate (cAMP) elicited from a glass port forming the controlled chemical gradient. Moreover, migrating cells were able to enter the gradient generating ports in the cover slip sized on-chip OMDs.

In certain embodiments, the OMDs or the open chemotaxis devices allow quantitative measurement of the migration rates of cells in multiple gradients within a single device. With an "open" system, the experimenter can pipette cells into a cell loading port that is accessible to the outside environment. (Jowhar, et al., 2010.) In these OMDs, the cell loading port remains open throughout the experiment; amenable to buffer addition, additional treatments, or perfusion. The benchmarks for this device included developing a platform that would allow simple cell loading, dynamic control of gradients, high resolution fluorescence microscopy, visualization of multiple gradient generating ports simultaneously, and reusability.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1: Open Passive Gradient Generators in Bulk Silica Chip

Figure 8:
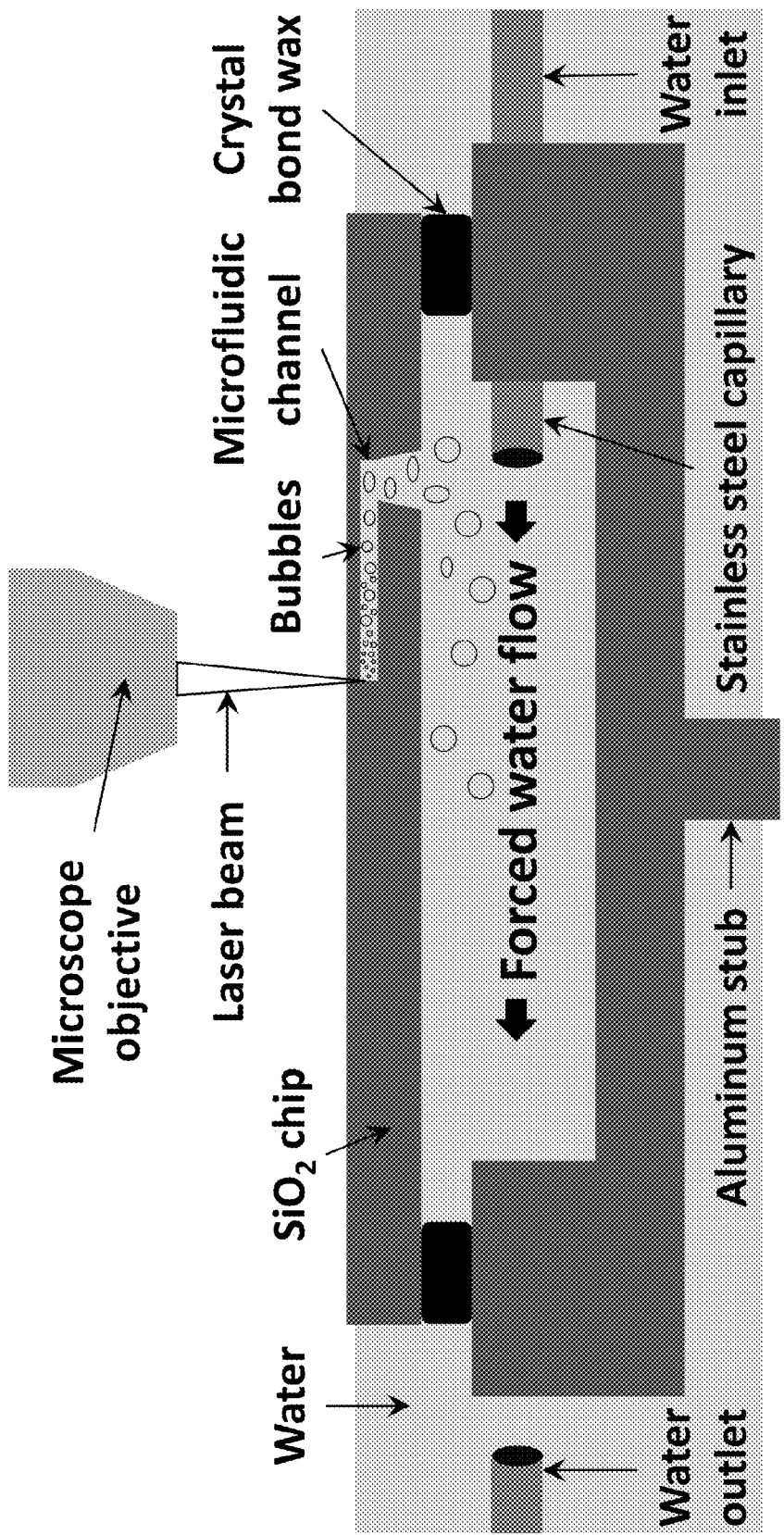
FIG. 8 shows a cross-sectional view of the water assisted femtosecond laser micromachining of the fused silica chip according to one embodiment of the present invention.

Fused silica material was chosen as a substrate because of its toughness, excellent optical properties, low background fluorescence and machinability by a femtosecond laser (see FIG. 8). The inventors have constructed an on-chip gradient generating device capable of producing multiple cAMP chemoattractant gradients.

Figure 1B:
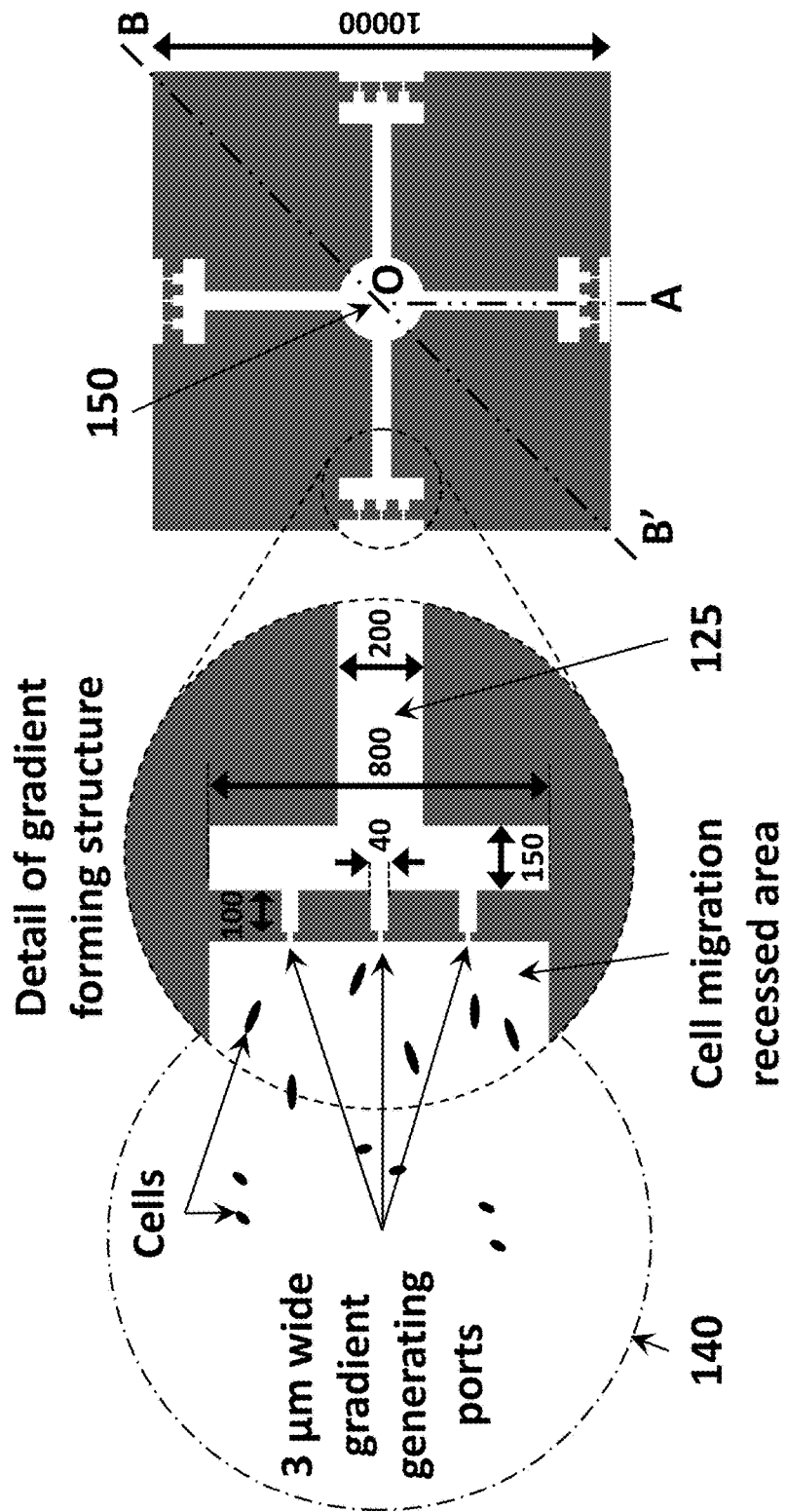
FIG. 1B schematically shows a bottom view of the four-sided bulk silica gradient generating device as shown in FIG. 1A according to one embodiment of the present invention.
Figure 1C:
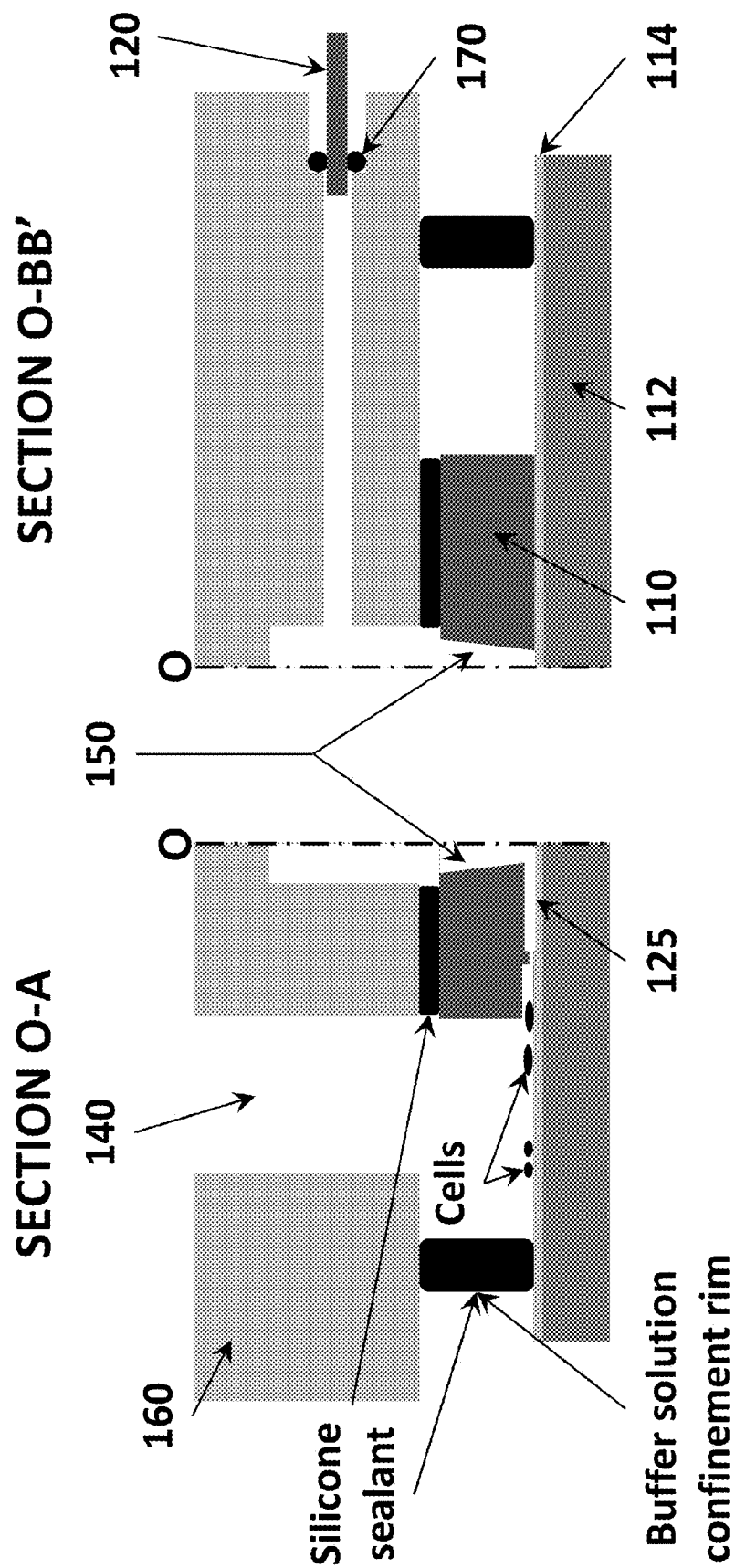
FIG. 1C schematically shows cross-sections O-A, O-B and O-B' of the four-sided bulk silica gradient generating device as shown in FIG. 1B according to one embodiment of the present invention.
Figure 1D:
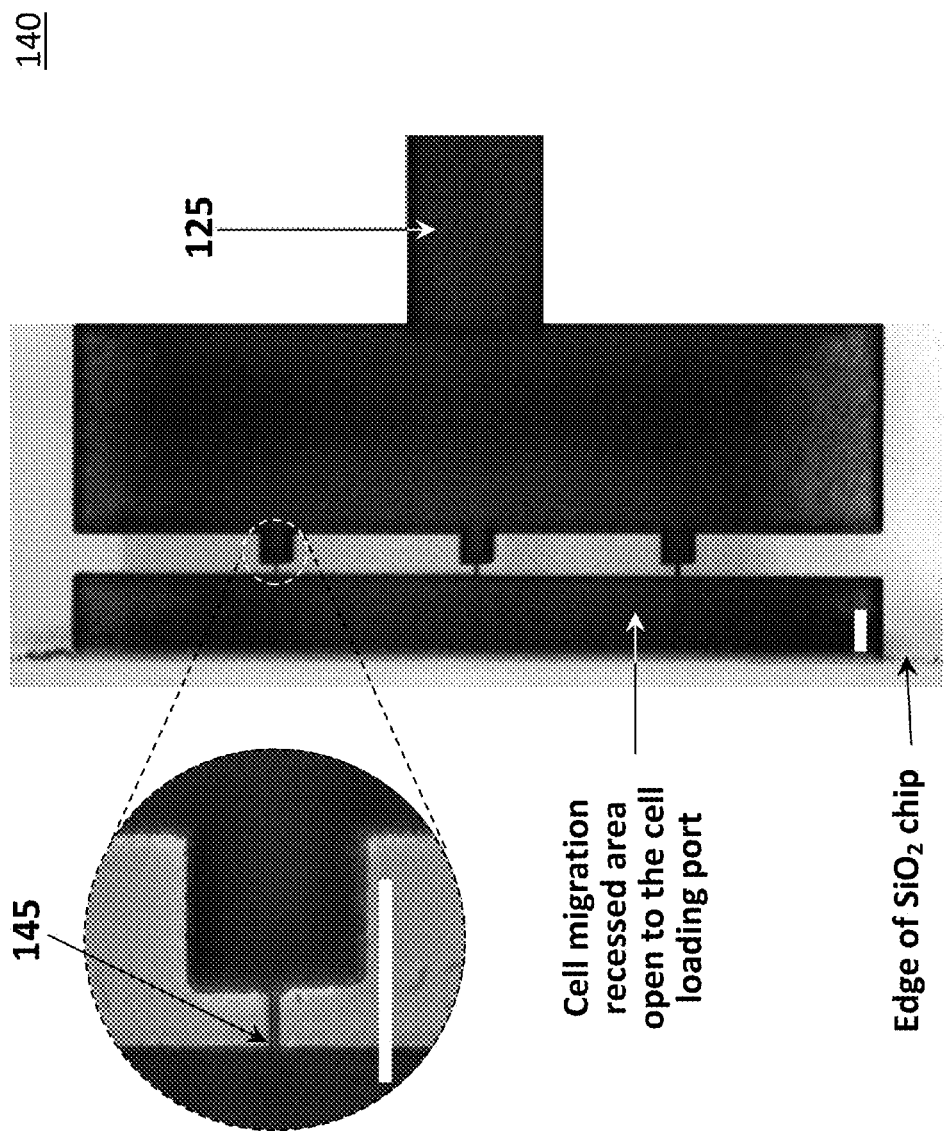
FIG. 1D schematic shows a detailed optical microscope image of the cell loading ports as shown in FIG. 1C according to one embodiment of the present invention.

FIG. 1A schematically shows a four-sided bulk silica gradient generating device according to one embodiment of the present invention. FIG. 1B schematically shows a bottom view of the four-sided bulk silica gradient generating device as shown in FIG. 1A according to one embodiment of the present invention. FIG. 1C schematically shows cross-sections O-A, O-B and O-B' of the four-sided bulk silica gradient generating device as shown in FIG. 1B according to one embodiment of the present invention. FIG. 1D schematic shows a detailed view of the cell loading ports as shown in FIG. 1C according to one embodiment of the present invention.

As shown in FIGS. 1A-1D, the gradient generating device 100 has a fused silica chip 110, a chemoattractant supply inlet 120, a chemoattractant supply outlet 130, and a plurality of cell loading ports 140. A microfluidic channel 125 is connected between the chemoattractant supply inlet 120 and outlet 130. A chemoattractant reservoir 150 exists in the silica chip 110. The silica chip 110 includes acrylic manifold 160, and the chemoattractant supply inlet 120 and outlet 130 has o-rings 170 for sealing purposes. The silica chip 110 is formed on a glass substrate 112, and includes a PDMS layer 114. Each cell loading port 140 has a plurality of 3 µm gradient producing ports 140.

The chemoattractant solution entered the device 100 via the chemoattractant supply inlet 120, traveled through the 2 mm thick acrylic manifold 160 and down the center of the device where chemicals entered the machined 500 µm thick silica chip 110, as shown in FIG. 1C. These gradient producing ports 145 and channels 125 in the silica 110 chip were plasma bonded to the 170 µnm PDMS-coated cover slip 114, as shown in FIGS. 1C and 1D. The microfluidic channel 125 spans over the bottom surface of a 10×10×0.5 mm³ fused silica chip 100. The microfluidic channel 125 are sealed from below by the 170 µm thick cover glass 112 that is coated with the 20 µm thick PDMS layer 114. Dimensions are in µm. The manifold 160 is silicone-bonded to the top surface of the fused silica chip 110. Rubber o-rings 170 seal the connections between the chemoattractant supply tubings 120 and 130 and the acrylic manifold 160.

In each cell loading port 140, the number of the gradient producing ports 145 may vary, as the inventors have a number of successful iterations of the device 100. In this embodiment, here a four-sided device is provided, with three gradient producing ports 145 each. The gradient producing ports 145 as shown in FIG. 1D were about 3.0 µm wide. These gradient producing ports 145 can be varied in size from a few hundred nanometers to several microns for the production 1 of varying gradients in separate cell loading areas 140, as shown in FIG. 1A.

Figure 1E:
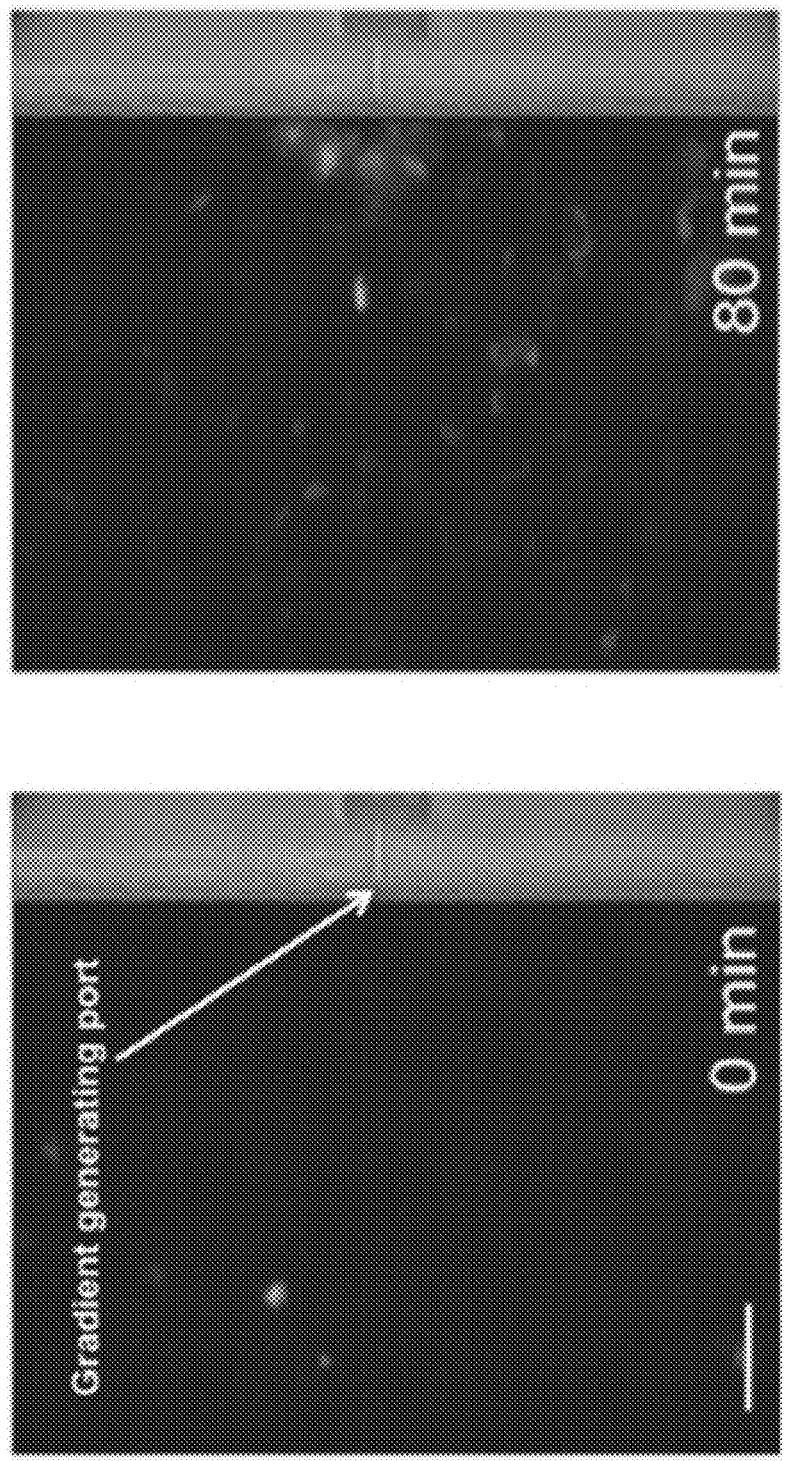
FIG. 1E schematic shows images prior to (0 minute) and after continuous exposure to a chemoattractant gradient (80 minutes) of the cells rapidly migrated towards the cAMP source according to one embodiment of the present invention.

FIG. 1E schematic shows images prior to (0 minute) and after continuous exposure to a chemoattractant gradient (80 minutes) of the cells rapidly migrated towards the cAMP source according to one embodiment of the present invention. The device as described above was capable of producing multiple linear gradients similar to the single gradient made using a micropipette in an OMD. (Jowhar, et al., 2010.) *D. discoideum* cells expressing the Ras Binding Domain of Raf1 and fused to the green fluorescent protein (RBD-GFP) were loaded into the open cell ports and exposed to gradients of the chemoattractant cAMP, as shown in FIG. 1E. (Sasaki, et al., 2004.) This device was designed with a unique 100 µm recessed area so that cells would not settle directly on the gradient generating ports, as shown in FIGS. 1C and 1D. This is valuable, since each cell will have to travel at least 100 microns before reaching the chemoattractant port. Thus, one is able to gather much more information about the individual parameters of cell migration. Each 3 mm cell loading port was exposed to three different sources of cAMP (from three 3.0 µm gradient generating ports) under the control of a syringe or Harvard apparatus pump, which serves as a chemoattractant supply device. The syringe pump was used to apply a constant positive pressure to the loaded syringe, thus, preventing fluctuations in the gradient from potential backflow created by negative pressure. Cells rapidly migrated over the surface of the PDMS and towards all the gradient generating ports. In this way, the inventors have performed 3 replicate experiments at the same time.

Figure 2:
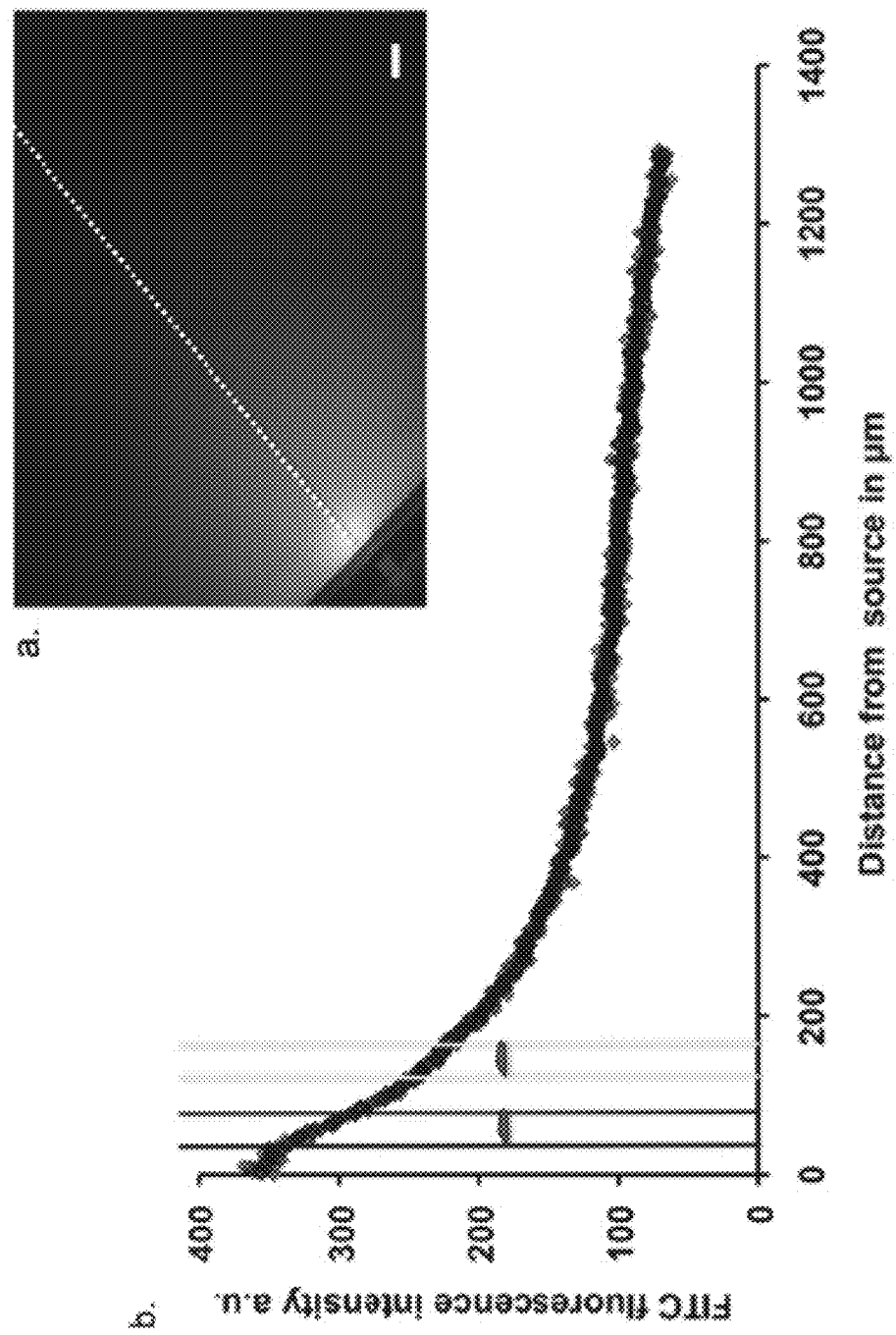
FIG. 2 shows a gradient profile of the four-sided $SiO_2$ gradient generating device, where (a) shows an image of the device a gradient of FITC 5 minutes after the pressure (50 μl/min.) was applied according to one embodiment of the present invention; and (b) shows a figure showing the relative changes in fluorescence intensity that a 20 μm cell might encounter in the gradient according to one embodiment of the present invention.

FIG. 2 shows (a) an image of the device a gradient of FITC 5 minutes after the pressure (50 µl/min.) was applied according to one embodiment of the present invention; and (b) a figure showing the relative changes in fluorescence intensity that a 20 µm cell might encounter in the gradient according to one embodiment of the present invention. As shown in FIG. 2(a), the white dotted line represents the line intensity measurements in panel B. The scale bar is 100 µm. As shown in FIG. 2(b), to determine the difference in concentrations the cells might encounter along the device, the inventors have calculated the relative changes in fluorescence intensity that a 20 µm cell might encounter in the gradient. FIG. 2(a) shows the graph of the fluorescence intensities of the dotted line plotted as a function of distance in microns. Cell 1 (green) in Region 1 (50-70 µm) depicted by two yellow lines and cell 2 (green) in region 2 (170-190 µm) depicted by two blue lines represents the gradient that a 20 µm cell would encounter in this region of the device. The intensity change from the front to the rear of cell 1 in region 1 is 8%. Cell 2 in region 2 only displays a change in intensity of only 4%.

These gradients were stable for at least 60 minutes, as shown in FIG. 2, and the cells were capable of migrating over a distance of several hundred microns during the experiments, as shown in FIG. 1E. Cell tracking was difficult since large numbers of cells converged as they neared the gradient generating ports. A number of solitary cells that could be followed continuously were tracked using the Cell Tracker program written in LabVIEW™ software (FIG. 3a). Cells migrated with high chemotactic efficiency towards the microfluidic gradient generating port (see FIG. 3(b) for chemotactic 1 index and cell persistence).

Figure 3:
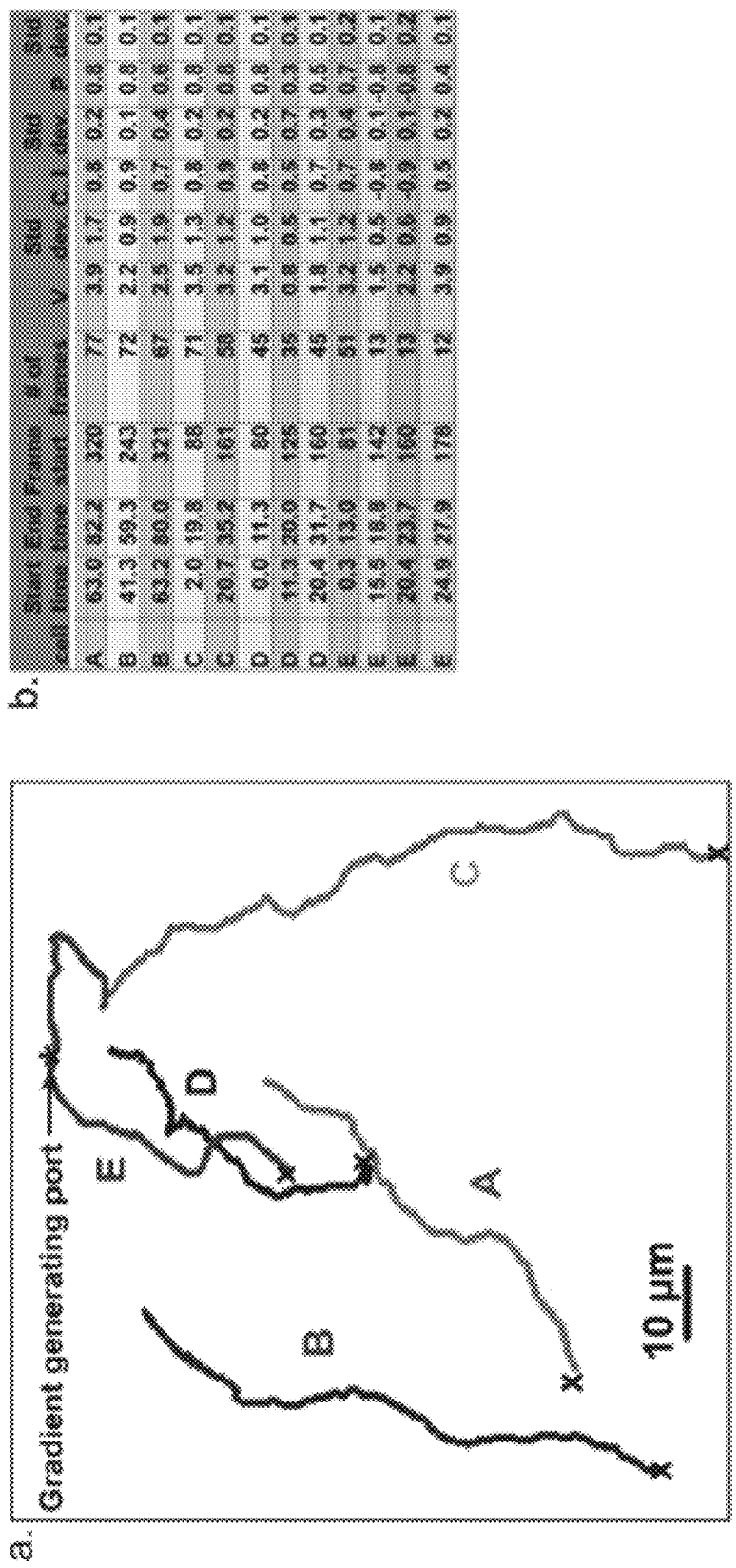
FIG. 3 shows the *Dictyoselium discoideum* chemotaxis migration toward a point source of cAMP in the glass micropipette device according to one embodiment of the present invention, where (a) shows cell migration tracks of five independent cells (A-E), and (b) shows a table of the quantitation of the chemotaxis parameters for cells A-E.

FIG. 3 shows the *Dictyoselium discoideum* chemotaxis migration toward a point source of cAMP in the glass micropipette device according to one embodiment of the present invention, where (a) shows cell migration tracks of five independent cells (A-E), and (b) shows a table of the quantitation of the chemotaxis parameters for cells A-E. The cell migration tracks of the cells A-E, as shown in FIG. 3(a), were analyzed from the same experiment. The cells migrate directionally toward the cAMP source labeled with an asterisk in the figure. The starting point for each cell is marked with and X. Scale bar is 10 µm. In the table as shown in FIG. 3(b), V, C.I., and P represent velocity (microns/min.), chemotactic index, and persistence, respectively. The same cells were measured at different points along the traveled path to the source and are scored more than once. All cells exhibited strong chemotaxis indices and persistence toward the source. Cell E likely becomes adapted to the high cAMP concentration at the source, wanders away until it deadapts and then again returns to the source.

Example 2: Open Passive Gradient Port Generators in Thin Silica Cover Slip (I)

Figure 4:
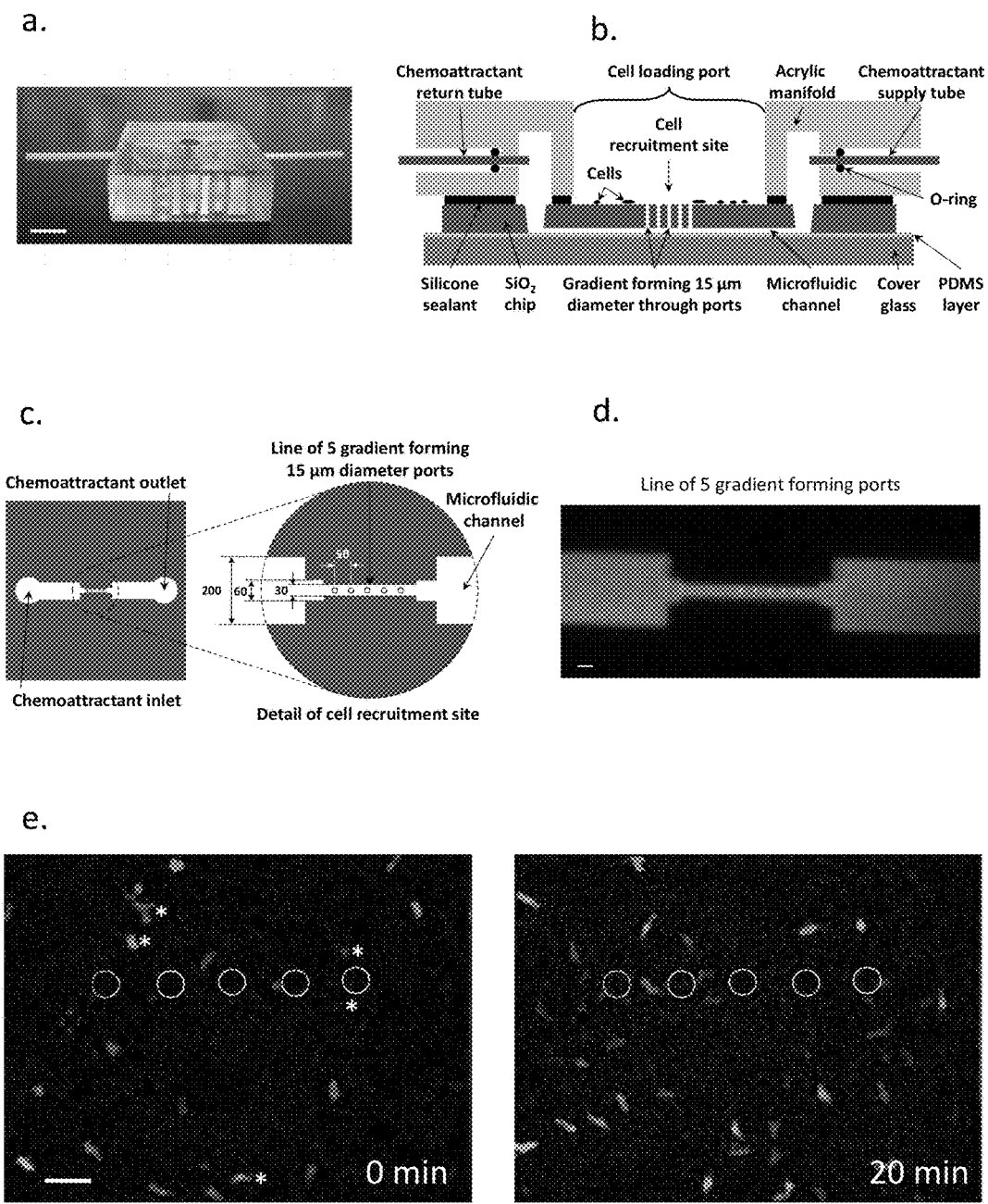
FIG. 4 shows of a device according to one embodiment of the present invention, where (a) shows a side view photograph of the device according to one embodiment of the present invention; (b) shows a schematic longitudinal cross-section of the device; (c) shows a bottom view of the femtosecond laser machined fused silica cover slip; (d) shows a photograph of the cell recruitment site loaded with FITC dye showing a line of five chemical concentration gradient forming 15 μm diameter holes; and (e) shows fluorescent images at time 0 and after 20 minutes of exposure to a cAMP gradient according to certain embodiments of the present invention.

FIG. 4 shows (a) a side view photograph of a device according to one embodiment of the present invention; (b) a schematic longitudinal cross-section of the device; (c) a bottom view of the femtosecond laser machined fused silica cover slip; (d) a photograph of the cell recruitment site loaded with FITC dye showing a line of five chemical concentration gradient forming 15 µm diameter holes; and (e) fluorescent images at time 0 and after 20 minutes of exposure to a cAMP gradient according to certain embodiments of the present invention.

As discussed above, the four-sided OMD in bulk silica is a useful platform for performing general chemotaxis studies. However, a gradient generating device within a thin silica cover slip provides better bright field optics and also would allow us to machine vertical surface ports that provide passive chemoattractant gradient sources to a large field of cells. The inventors reasoned that machining ports in an imaging cover slip could provide an avenue for multiple chemoattractant gradients for cells to crawl towards and would provide flexibility for added microfluidic configurations.

As shown in FIG. 4, the device would also be more simple, since the gradient is generated from the cover slip and not an additional silica component. This OMD consisted of an acrylic manifold, an upper-machined 100 µm silica cover slip, a 20 µm thick layer of PDMS, and a bottom 100 µm thick silica cover slip, as shown in FIG. 4(b). Chemoattractants were pumped in through the acrylic manifold and then down into microfluidic channels machined horizontally in the cover slip and connected to vertically machined channels at the center of the device, as shown in FIGS. 4(c) and 4(d). The large horizontal channel was loaded with chemoattractant and relieved of any air bubbles, as shown in FIG. 4(b). Cells were readily loaded by micropipetting into the cell loading area where they were allowed to settle and adhere to the silica cover slip. The channels were primed with buffer by a syringe; we observed that the cells randomly migrated on the surface. Once the cells adhered, cAMP was pumped in to form a chemoattractant gradient. To perform this function, a Harvard apparatus pump was used to create positive pressure on the chemoattractant loaded syringe.

Figure 5:
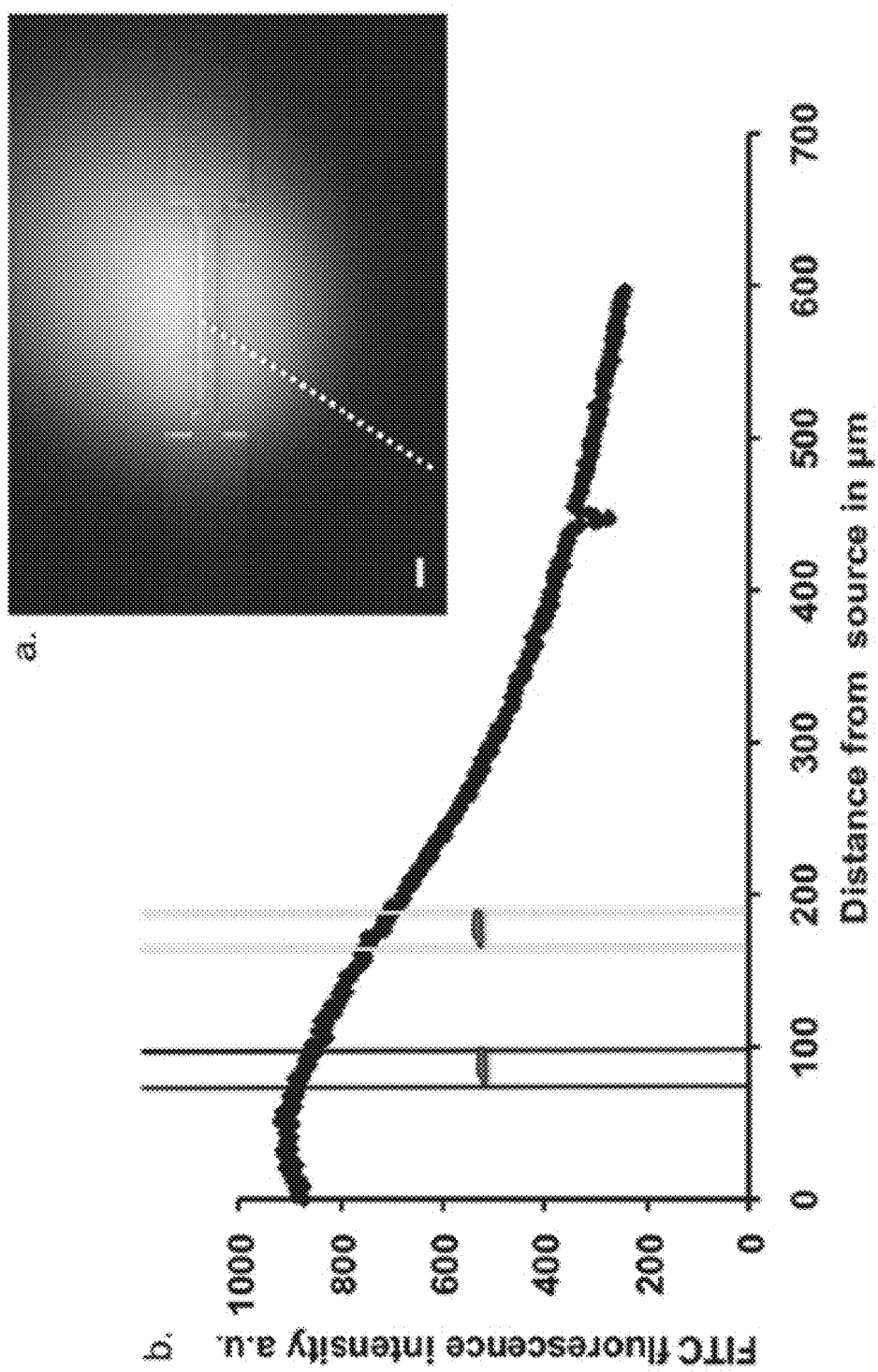
FIG. 5 shows a Gradient profile of the passive gradient generating ports in a thin $SiO_2$ coverlip, where (a) shows an image cell recruitment device 5 min after the Harvard syringe pump was started according to one embodiment of the present invention; and (b) shows a figure showing of the FITC fluorescence gradient profile (dotted white line) as a function of distance according to one embodiment of the present invention.

FIG. 5 shows a gradient profile of the passive gradient generating ports in a thin $SiO_2$ coverlip, where (a) shows an image cell recruitment device 5 min after the Harvard syringe pump was started according to one embodiment of the present invention; and (b) shows a figure showing of the FITC fluorescence gradient profile (dotted white line) as a function of distance according to one embodiment of the present invention. As shown in FIG. 5, the device resulted in a stable, relatively linear gradient over time.

As shown in FIG. 5(a), the image was extracted from a 60 min supplemental movie. The white dotted line represents where the gradient profile was measured. Scale bar is 60 µm. FIG. 5(b) shows that cell 1 (green) in Region 1 (70-90 µm) depicted by two yellow lines and cell 2 (green) in region 2 (170-190 µm) depicted by two blue lines represents the gradient that a 20 m cell would encounter in this region of the device. Similar to the bulk silica device, changes in concentrations were calculated to be 3% for cell 1 and 6% for cell 2.

*D. discoideum* cells expressing RBD-GFP rapidly chemotaxed towards the cAMP gradient elicited from the ports and in many cases, continued on and entered the port. Five cells are marked with white asterisks at the beginning of the movie (time 0 minute) and two more cells are recruited into the ports from distances outside of the initial field of view during a 20-minute movie, as shown in FIG. 4(e).

Figure 6:
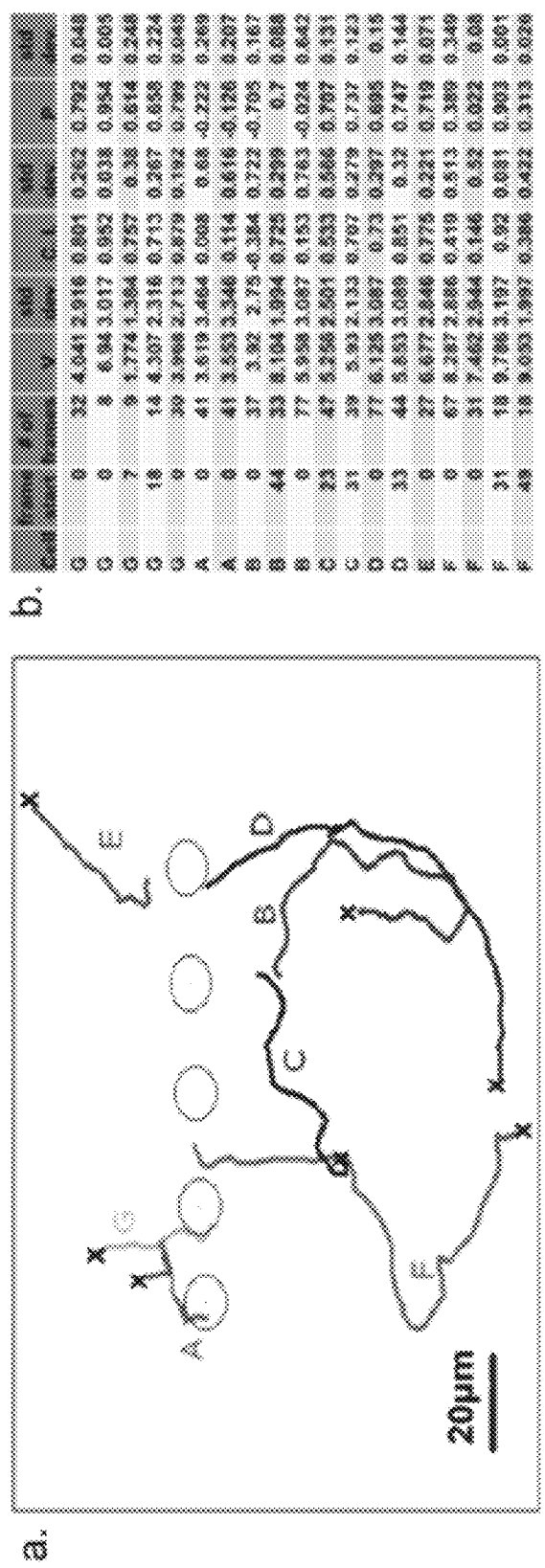
FIG. 6 shows the *Dictyoselium discoideum* chemotaxis migration toward a point source of cAMP in the glass micropipette device according to one embodiment of the present invention, where (a) shows cell migration tracks of seven independent cells (A-G), and (b) shows a table of the quantitation of the chemotaxis parameters for cells A-G.

The cell paths were tracked, as shown in FIG. 6(a) and their chemotactic efficiency is summarized in FIG. 6(b). FIG. 6 shows cells directionally migrating toward the gradient generating openings in the cell recruitment device. As shown in FIG. 6(a), tracks of seven individual cells (A-G) migrating toward the cAMP source openings (open circles). The starting point for each cell is marked with and X. Scale bar is 20 µm. B.) Quantitation of the migration parameters for cells A-G. In the table as shown in FIG. 6(b), V, C.I., and P represent velocity (microns/min.), chemotactic index, and persistence, respectively. The multiple data points in the table for cells A-G represent different sections of the path as the cell traveled toward the cAMP source. The majority of the cells tracked exhibited good chemotaxis indices and persistence. Cell G migrates into the gradient generating hole during tracking.

Example 3: Open Passive Gradient Port Generators in Thin Silica Cover Slip (II)

As proof of principle, the inventor next developed an OMD where the manifold was on the side opposite of the gradient generating ports as a prototype for the construction of a similar cover slip gradient generator as a window for intravital imaging. As in the previous cover slip device, channels were etched through a cover slip sized (22×22 mm×170 µm thick) square piece of silica adhered to an acrylic manifold for long-term support, as shown in FIGS. 7(a) and (b).

Figure 7:
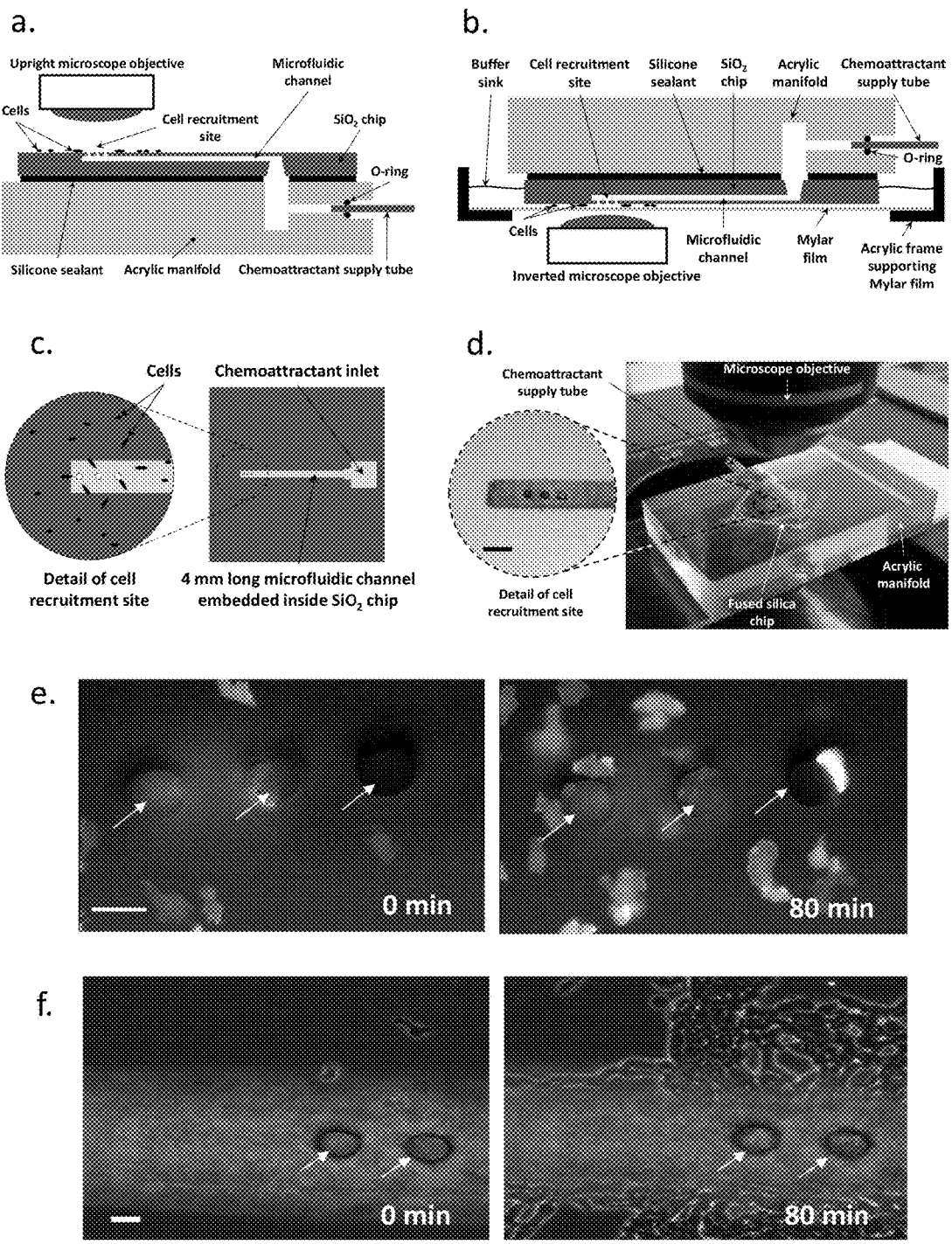
FIG. 7 shows of a device according to one embodiment of the present invention, where (a) shows a schematic view of a device cross-section when used with an upright microscope; (b) shows a schematic view of the device when inverted and used with an inverted microscope; (c) shows a cell seeding surface of the silica device surface showing the 3 chemoattractant releasing ports; (d) shows a photograph of the cover slip device on an upright microscope; (e) shows frames of cells migrating toward and into the three gradient generating ports during an 80-minute time series; and (f) shows images of cells migrating toward the same three ports as above except these cells were imaged on an inverted Zeiss microscope in phase contrast according to one embodiment of the present invention.

FIG. 7 shows of a device according to one embodiment of the present invention, where (a) shows a schematic view of a device cross-section when used with an upright microscope; (b) shows a schematic view of the device when inverted and used with an inverted microscope; (c) shows a cell seeding surface of the silica device surface showing the 3 chemoattractant releasing ports; (d) shows a photograph of the cover slip device on an upright microscope; (e) shows frames of cells migrating toward and into the three gradient generating ports during an 80-minute time series; and (f) shows images of cells migrating toward the same three ports as above except these cells were imaged on an inverted Zeiss microscope in phase contrast according to one embodiment of the present invention.

As is the case in FIG. 1, cells in this open device migrate on the surface of the silica cover slip. As shown in FIG. 7(b), this device differs from the upright apparatus because it has an added culture chamber with a 20 mm thick Mylar film bottom that the apparatus rests on. As shown in FIG. 7(d), inset is magnified image of three 15 mm diameter gradient generating ports in the silica cover glass. Scale bar is 50 µm. As shown in FIG. 7(e), white arrows mark the gradient generating ports. The left picture shows the initial time point (0 min) just prior to adding cAMP gradient. The right picture represents the last time point of the 80-minute movie. During the course of the movie, eight cells actually migrated into the ports. Scale bar is 15 µm. As shown in 7(f), cells were loaded with the device upright, allowed to settle, and then the apparatus was inverted and place into a bath with a Mylar film bottom. Cell migration is observed through the Mylar film. Left image represents the initial image (0 min) just prior to cAMP gradient addition and the right image represents the 80-minute time point. Scale bare is 15 µm.

These channels extended 4 mm from the manifold port through the cover slip and are connected to the surface in the viewing area by three 15 µm-sized ports. The manifold was connected to a chemoattractant supply tube fed by a syringe. The inventors first demonstrated the viability of the device on an upright microscope using a 40× water immersion lens. The cell buffer was used for water immersion. *D. discoideum* cells expressing the actin marker LimE-RFP rapidly migrated towards and into the cAMP gradient cover slip ports, as shown in FIG. 7(e).

In other experiments, we allowed *D. discoideum* cells to adhere to the silica surface. The OMD was then inverted and placed into a Mylar film imaging chamber created to hold the buffer and to provide a chemical sink for the chemoattractant.

Figure 9:
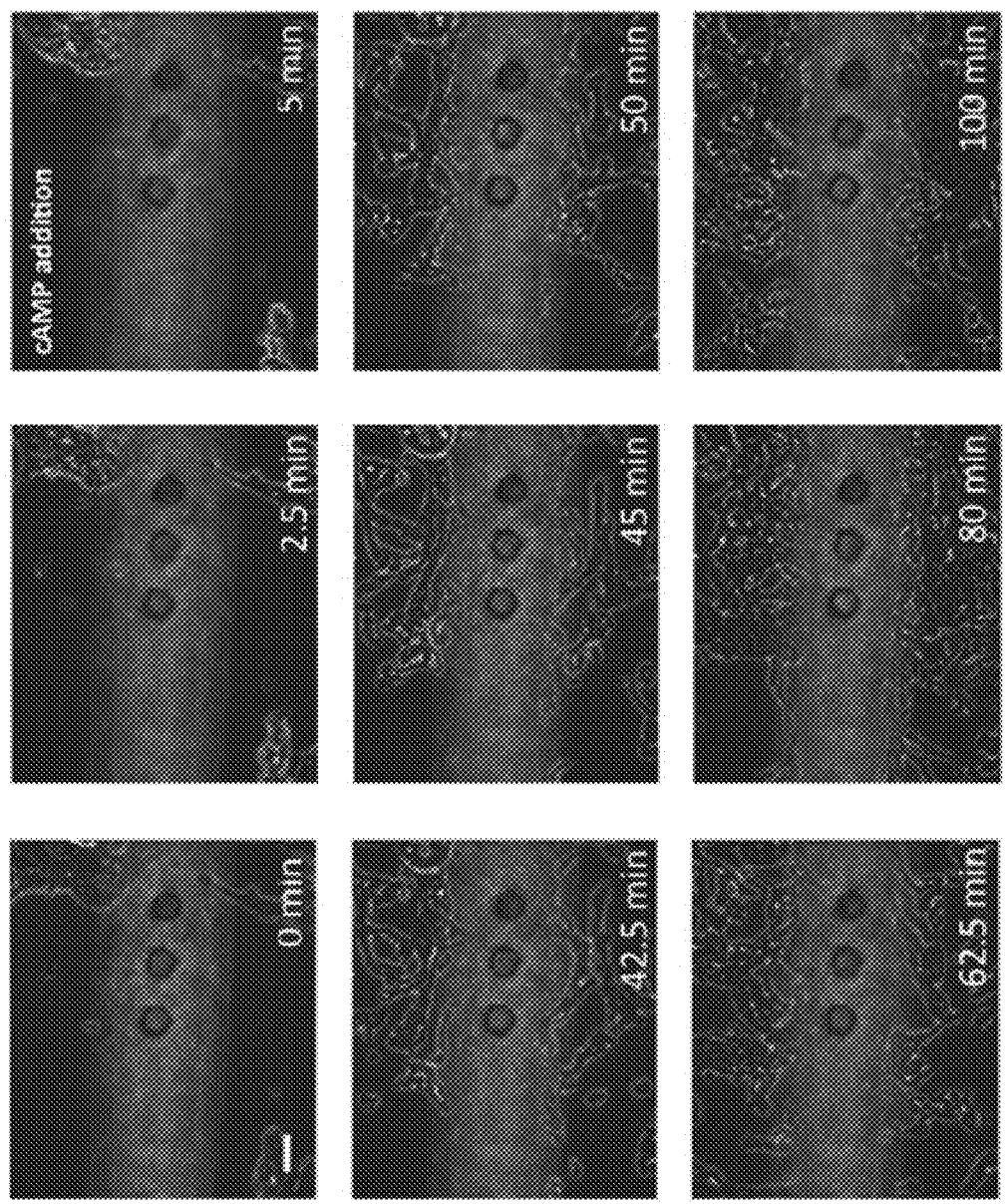
FIG. 9 shows photographs of montage of cells migrating toward the passive gradient generating ports over 100 minutes according to certain embodiments of the present invention.

FIG. 9 shows photographs of montage of cells migrating toward the passive gradient generating ports over 100 minutes according to certain embodiments of the present invention. Images of cells at the respective time points migrate toward cAMP within the gradient generating ports over 100 mins. As time progresses an increasing amount of cells begin to move toward and into the gradient generating ports. At the later time points (60 minutes and later) the cells began to stream into the gradient generating ports. The cells were imaged in phase contrast. At the 5-minute time point cAMP was added to the gradient generator. Scale bar is 20 µm. Live cell imaging was performed using a high NA 40× oil immersion objective lens, as shown in FIGS. 7(b) and (f). Migrating cells were imaged on an inverted microscope, as shown in FIG. 7(f) and FIG. 9. Cells expressing RBD-GFP responded to the chemoattractant gradient of cAMP and migrated towards and into the silica surface ports.

Example 4: Prepartion Methods

Media and Buffers

HL-5 was purchased from Formedium. HL-5 media consists of 22 grams of HL-5 powder, 10 grams of dextrose and 1 Liter of double distilled $H_2O$. Developmental Buffer (DB) consists of 5 mM $Na_2HPO_4$, 5 mM $KH_2PO_4$, 1 mM $CaCl_2$, and 2 mM $MgCl_2$.
Strains Used

*Dictyostelium discoideum* wild type AX2 strain expressing RBD-GFP or LimE-RFP were used for cAMP chemotaxis (Muller-Taubenberger, 2006; Sasaki & Firtel, 2009). The plasmid pDM RBD-GFP was provided by Arjan Kortholt and Peter Van Haastert. pDM RBD-GFP confers G418 resistance.
cAMP Preparation 10 mM stock of cAMP (Sigma) solution was made in double distilled $H_2O$. For cAMP development, a 2.5 µM working solution was made in DB buffer. For cAMP chemotaxis, a 10 µM working solution was made in DB buffer.
cAMP Development 50 mL of $2 \times 10^6$ cells per ml were centrifuged at 1200 rpm and subsequently washed three times with DB buffer. The pellet was then resuspended in 5 mLs of DB buffer resulting in $2 \times 10^7$ cells per mL. The 5 mL resuspension was transferred to a 150 mL flask and was shaken at 110 rpms for 1 hr. After the initial 1 hr shake, the cells were then pulsed with approximately 100 µL of the 2.5 µM cAMP every 6 minutes for 5 hrs. After the 6 hr development the cells were treated with 5 mM caffeine and shaken for 30 minutes to basalate the cells.
Gradient Characterization The gradient measurements were carried out using 10 µM FITC loaded into a syringe attached to a Harvard Apparatus syringe pump. To create the gradient, a small amount of positive pressure (50 µL/hour flow rate) was added to the syringe containing the FITC. Images were taken of the device with the FITC gradient at time 0 minutes and up to 60 minutes at 5 minute intervals. The FITC fluorescence profile was measured using Image J's Plot profile feature (U.S. National Institutes of Health, MD) and the intensity values were plotted as a function of distance using Microsoft Excel.
Chemotaxis Assay Using the Glass Passive Gradient Devices The device was connected to an inlet and outlet syringe on a Harvard Apparatus syringe pump using microfluidic tubing. Once the plumbing was connected the device was equilibrated with DB buffer at a rate of 50 µL/hr. Once the DB buffer had equilibrated in the device and there were no air bubbles the developed AX2:RBD-GFP or AX2:LimE-RFP expressing cells were loaded into the cell ports using a micropipette. The cells were allowed to settle on the bottom of the device for 10 minutes. After the cells were settled the DB buffer syringe was replaced with a syringe containing 10 µM cAMP (bulk silica gradient generating device) and 100 nM cAMP (silica coverslip device) and the flow rate was returned to 50 µL/hr.
Imaging Images were acquired on a Marianis Workstation equipped with a Cool Snap CCD camera and an Extended QE, high-speed cooled CCD camera (Cascade II 512). The microscope used was an inverted, wide-field epifluorescence microscope (Zeiss Axio Observer Z1). Images were acquired by SlideBook software (Intelligent Imaging Innovations). All time-lapse images were taken every 15 seconds. Images were also collected on an upright Zeiss Axioskop 2 FS with an Achroplan 40× 0.8 NA water immersion objective. All time-lapse images were taken every 15 seconds.
Visualization and Analysis of Chemotaxis In order to visualize the migration of cells and record the specifics of chemotactic response; a program was written with LabVIEW™ software. Time-lapse image data from Slidebook was exported to avi movie format. The movie files were then loaded in the cell tracking program. The user can view the image data in a window, play the file or examine individual frames. Tracking of cells uses the machine vision algorithms from LabVIEW™ Vision Development Package. The user selects the cell to track with a mouse, and the software records the x,y pixel coordinates of the centroid of intensity in the image for the fluorescent cell. The identified results of the search and the centroid are displayed in a window for visual verification of the software performance. As the user plays the movie, the software tracks the cell automatically and builds an array of x,y coordinates over the desired length of the track. The measured centroids are overlayed on the image data so that the tracking of the cell can be visually verified. The software has adjustments for the size and intensity of object identification for user flexibility.

Once the x,y path of the cell is known and the source of the chemoattractant is identified the chemotactic response can be quantified. The measured responses are the velocity of travel, the direction of travel (chemotactic index), and the persistence. The velocity is simply the distance between x,y pairs of the cell path divided by the time between points. Velocity can be measured point-to-point or integrated over several time steps. Chemotactic index (CI) is the cosine of the angle formed by the travel vector and the vector from the cell to the source. The travel vector is determined by the x,y track of the cell. The travel vector can be taken at each frame increment or integrated over several frames.

$$CI(n) = \cos(\text{angle } S\,X_n X_{n+m})$$

where CI is the chemotactic index of the cell at time n, S is the point source of the chemoattractant, $X_n$ is cell's position at the start point of the travel vector, and $X_{n+m}$ is the cell's position at the end point of the travel vector after the integration time increment m. It is useful to calculate the velocity and chemotactic index over short time scales corresponding to the movement of one cell length. For these time scales the chemotactic persistence, defined as the length of cell travel path divided by the change in distance to the source, is equal to the chemotactic index. The calculation of persistence is more useful over long time scales.
Device Design:

In one embodiment, a four-sided bulk silica gradient generating device as shown in FIG. 1A is provided. As shown in FIG. 1A, the device's microfluidic channels span over the bottom surface of a $10 \times 10 \times 0.5$ mm³ fused silica chip, which houses four chemical concentration gradient forming structures consisting of three ports each. An enlarged view of one of these gradient forming structures is depicted in FIG. 1B. Each one of the silica chip edges houses one of the gradient forming structures, in accordance with the device layout shown in FIGS. 1C and 1D. The microfluidic channels are sealed from below by a 170 µm thick cover glass that is coated with a 20 µm thick layer of polydimethylsiloxane (PDMS). The microfluidic channels stem from a central chemoattractant reservoir comprised of a 500 µm thick fused silica chip and a reservoir in the acrylic manifold that is silicone-bonded to the top surface of the fused silica chip. Rubber o-rings seal the connections between the chemoattractant supply tubing and the acrylic manifold. This device is designed to operate on an inverted microscope. Once the device is mounted and the microscope objective is focused on the PDMS surface under a cell loading port, the device is flushed with buffer solution. Cells suspended in buffer solution are pipetted into the cell loading port and allowed to settle and attach to the PDMS surface. The chemoattractant reservoir is then loaded with chemoattractant solution. As the chemoattractant seeps through the gradient forming structure, the cells chemotax over the smooth PDMS surface. This ensures direct and clear imaging of the individual cell responses.

In a further embodiment, the open passive gradient port generators in $SiO_2$ cover slip shown in FIG. 4 is provided. The device houses five chemical concentration gradient forming ports that stem from a single microfluidic channel, which passes along the bottom surface of a 10×10×0.1 $mm^3$ fused silica chip. The gradient forming holes traverse the 100 µm thick fused silica chip from the chemoattractant channel to the cell recruitment site, as indicated in the device layout shown in FIGS. 4c and 4d. The microfluidic channels are sealed from below with a PDMS coated, 100 µm thick cover glass, which draws directly from the chemoattractant supply via the acrylic manifold. The manifold is silicone-bonded to the top surface of the fused silica chip. Rubber o-rings seal the connections between the chemoattractant supply tubing and the acrylic manifold.

This device is designed to operate on an inverted microscope. Once the device is mounted and the microscope objective is focused on the cell recruitment site, the device is flushed with buffer solution. Cells suspended in buffer solution are pipetted into the cell loading port and allowed to settle on the top surface of the fused silica chip. The microfluidic channel is then loaded with chemoattractant solution. As the chemoattractant seeps through the gradient forming holes, the cells chemotax up the concentration gradient and can be imaged from below.

In a further embodiment, the open passive gradient port generators in $SiO_2$ cover slip shown in FIG. 7 is provided. The device houses a single cell recruitment site with three 15 µm diameter chemoattractant delivery ports that stem from a single microfluidic channel embedded inside a 10×10×0.2 $mm^3$ fused silica chip, as shown in FIG. 7. The microfluidic channel, located 60 µm below the surface of the fused silica chip, draws directly from the chemoattractant supply via the acrylic manifold that is silicone-bonded to the opposite surface of the fused silica chip, as indicated in the device layout shown in FIGS. 7(a) and 7(b). Rubber o-rings seal the connections between the chemoattractant supply tubing and the acrylic manifold.

This device can be operated on both an inverted and an upright microscope. In the inverted microscope configuration, as shown in FIG. 7(b), cells are loaded with the device upright, allowed to settle, and then the apparatus is inverted and place into a bath with a Mylar film bottom suspended over the microscope objective. The individual cells responding to the concentration gradient are imaged through the Mylar film. In the upright microscope configuration, as shown in FIGS. 7(a) and 7(d), cells suspended in buffer solution are pipetted onto the cell-seeding surface near the cell recruitment site. The buffer solution was used for water immersion using an upright Zeiss Axioskop 2 FS with an Achroplan 40× 0.8 NA water immersion objective. In both cases, the device is flushed with buffer solution and loaded with chemoattractant solution prior to use.

Device Fabrication:

The devices were fabricated and assembled in an ISO 1000 class clean room, in accordance with the procedure outlined in detail in Costa, 2011. (Costa, 2011) The microfluidic channels and the chemical concentration gradient forming structures were patterned on UV grade fused silica using the femtosecond laser micromachining system. (White, 2008; Zalloum, 2010) The three delivery ports and the embedded microfluidic channel of the glass intravital/profusion device were machined using water cavitation assisted, femtosecond laser micromachining, in accordance with the schematic shown in FIG. 8.

Discussion

The laser machined, on chip OMDs provide the flexibility to develop a variety of chemotaxis platforms for cell migration studies. On-chip OMDs and fused silica microfluidics in general have a number of distinctive features not found with PDMS devices. They are durable, easy to unclog and fill and reusable. With glass, it is also possible to etch channels and ports down to a few hundred nanometers and microchannels can be easily created in three dimensions. Glass has the added benefit of being rigid, so that changes in flow can be regulated quickly and accurately. Microfluidic systems are considered uniquely suited for achieving a level of precision and gradient control that is necessary for quantitative studies of cell behavior. However, typical active mixing gradient generators require constant fluid flow and often fail to form reproducible gradients. Small changes in the device structure, cell debris, and air bubbles are common causes for these variations. Several groups have tried to bypass these problems by using microfabricated channels that respond to passive gradients. (Abhyankar, et al., 2006; Butler, 2010; Dimov I K, 2011; Englert D1, 2009; Keenan T M, 2010; Li Jeon, 2002; Li X, 2011; Lo J F, 2010; Lovchik R D, 2010; Taylor, 2005.) However, closed system microfluidic devices require a complicated cell loading process and are difficult to keep in working condition. To avoid these problems, we created a unique open system for migration studies.

Previously published PDMS-based OMDs rely on microfluidic and micropipette technologies, but provided the experimenter with a platform that offered easy cell loading, 3D channels for migration, and a carefully defined passive gradient. (Jowhar, et al., 2010.) This earlier type of platform is useful for laboratories that have access to a micromanipulator and a micropipette system. The on-chip OMD devices described here are capable of creating one or more passive gradients without the need for these expensive and large micromanipulators which commonly do not fit into microscope environmental and temperature control chambers. In their simplest form, the bulk glass devices described in The device as shown in FIG. 1 can be easily bonded into a standard one well-chambered cover slip slide and will work on any inverted microscope for standard prokaryotic or eukaryotic chemotaxis analyses. Because these devices sit in an open system, they are typically submerged in several milliliters of buffer and provide a large sink for the chemoattractants so that the gradient can be maintained for several hours. The inventors were able to observe hundreds of *Dictyostelium* cells migrating rapidly to multiple ports eliciting stable passive gradients. We found that cells detected and responded to a stable gradient in the bulk device for these long time periods. Cells were tracked and their velocity, chemotactic index, and persistence reported while migrating toward the cAMP source. These on-chip OMDs can be readily coupled to 3D microfluidic channels to perform quantitative experiments similar to those described using our PDMS-based OMD device. (Jowhar, et al., 2010.) Furthermore, on-chip OMDs permit multiple experiments to be performed on the same chip. The basic designs described here are extremely easy use and could be useful in a laboratory-teaching environment in both high school and university levels.

Machining microfluidic channels into the thinner cover slip-sized silica as described in FIGS. 4 and 7 will enable migration assays on any microscope. The inventors have demonstrated the utility of these OMDs by setting up passive gradients and visualizing cells chemotaxing towards and into the gradient generating ports. In the first cover slip device in FIG. 4, the cells were imaged using an inverted microscope. A PDMS or machined glass chip with microfluidics could be mounted on top of a cover slip gradient producing port (and inside a larger cell loading area) for a variety of cell migration studies. Multiple ports could be integrated into the cover slip so that one could perform numerous experiments at the same time. The first cover slip design demonstrated that we could image cells through a machined cover slip device and showed that a stable radial gradient could emanate and recruit cells directionally toward the five source openings. The devices provided a chemoattractant gradient that could be sensed by cells. This was evident from the tracking and quantitative analysis of the migrating cells.

With the first cover slip device, the manifold was on the same side as the cell loading port. Cell observation was performed through the machined cover slip and a thin layer of PDMS. To obtain higher-resolution images of cells, the inventors created a second cover slip device where the input manifold was on the side opposite the gradient producing ports.

Using the newer device, higher quality images of migrating cells were first obtained on an upright microscope with water immersion, as shown in FIG. 7(*e*). The inventors then used the same device for imaging on an inverted microscope, but coupled it to a specialized one-well chamber constructed with a 20 µm thick Mylar film bottom. In this way, high numerical aperture oil immersion microscopy may be performed while maintaining the cells in a large reservoir of buffer and preserving the chemoattractant gradient, as shown in FIG. 7(*f*).

Example 5: Ultra-High Aspect Ratio Nanoholes for Chemotaxis and Cell Viability

Recent advancements in the femtosecond laser ablation technique suggest that yet another platform may be used for release of chemoattractants. In certain embodiments, a new method will allow chemotactic studies to be performed without microfluidic devices or micromanipulators on a microscope.

In certain embodiments, chemoatttractant molecules may be deposited inside nanopores that have been etched into a glass cover slip. These cover slips can be stored in the laboratory and used without preparation. Dropping cells in buffer solution on the glass coverslip dissolves and releases the chemoattractants and will set up a passive diffusion gradient. With these devices cell viability and chemotactic studies could be routinely performed in any clinical laboratory or classroom. In addition, nanopores could be etched into cover slips that would be used in a 96 well plate format to screen for ligands or orphan receptors for a variety of cell types, including cancer cells Inhibitors of chemotaxis could also be examined. Lastly, nanopores may be etched into cover slips for high throughput screening that would be used in conjunction with intravital imaging. This could be potentially valuable as you would not need complex microfluidics incorporated into the coverslip. To the inventors' knowledge, this would be the first high throughput screening platform that could be performed on a living organism.

Figure 19:
FIG. 19 shows high aspect ratio nanoholes, replica arrays and nanowires according to one embodiment of the present invention.

In 2008 White, et.al, (UTSI authors) published a paper on the creation of high aspect ratio nanoholes by femtosecond laser abaltion. The results of the experiments were wholly unexpected. FIG. 19 shows high aspect ratio nanoholes, replica arrays and nanowires according to one embodiment of the present invention. As shown in FIG. 19, ultra-high aspect ratio (50:1) nanoholes were created by single femtosecond laser pulses. The holes were replicated with cellulose acetate allowing analysis of the material removed in a single laser pulse. The figure below shows nanoholes, and cellulose acetate replicas of the holes.

In certain embodiments, the nanopores can be placed in any pattern on a glass coverslip. The entrance hole can be varied, typically a 300 nm diameter pore will be 15 µm deep and have a volume of 0.1 femtoliter. Pores can be etched to one micron diameter and 0.5 picoliters.

A remarkable feature of these nanopores is the ability to fill the hole with a variety of materials. Fused silica has a naturally high zeta potential so it is not surprising that aqueous and polar species will readily fill these holes. Crystallization from aqueous solution will most likely occur on a surface rather than in the bulk solution because of surface energy considerations. Indeed, the most favorable surface is a pore, especially one near the critical dimensions of the crystallite. The damaged surface of the pore is a natural catalytic site. It is therefore likely that any crystallization will start in the nanopores first for a wide range of compounds. The inventors have successfully tested this process with folic acid and plan experiments with cAMP.

Ultra-high aspect nanoholes may be created in conductive materials by high energy particle and electron beams in vacuum, but it is extremely difficult in insulating materials such as glass. These ultra-high aspect ratio nanoholes are created by single femtosecond laser pulses in air at very high rates. The process speed is limited by the motion control system only, not the ablation process. It is feasible to mass produce these devices as a disposable item for clinical and laboratory use.

Other Examples

The cover slip devices described here provided evidence that small ports etched in glass can set up a passive chemoattractant gradient and can recruit cells into the ports. The inventors are now developing microfluidic windows for use in intravital imaging in mice.

Figure 10:
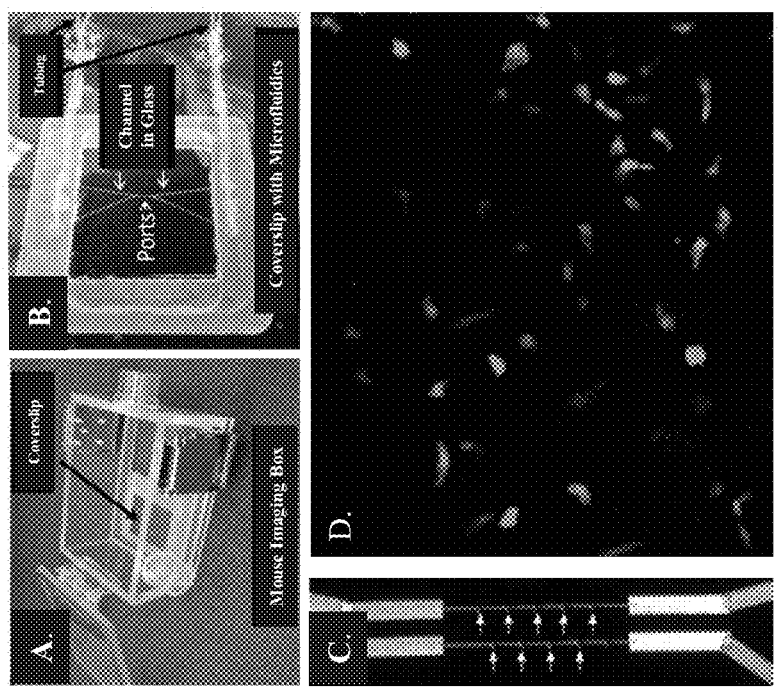
FIG. 10 shows Large Microfluidic Coverslips for intra-vital imaging of a mouse according to certain embodiments of the present invention, where (a) shows coverslip device inserted into a mouse imaging box. The imaging box can keep the mouse warm and also was used to anesthetize with isofluorine.; (b) shows higher magnification of channels present in coverslip; (c) shows a close up of the ports on the microfluidic coverslip device; and (d) shows a fluorescenct image of myeloid cells that had their migration rates altered by addition of epidermal growth factor (50 ng/ml).

FIG. 10 shows Large Microfluidic Coverslips for intravital imaging of a mouse according to certain embodiments of the present invention, where (a) shows coverslip device inserted into a mouse imaging box. The imaging box can keep the mouse warm and also was used to anesthetize with isofluorine.; (b) shows higher magnification of channels present in coverslip; (c) shows a close up of the ports on the microfluidic coverslip device; and (d) shows a fluorescenct image of myeloid cells that had their migration rates altered by addition of epidermal growth factor (50 ng/ml).

Figure 11:
FIG. 11 shows DAPI Staining Using Coverslip Microfluidics according to certain embodiments of the present invention, where (a) shows an anesthetized mouse (intraperitoneal anesthetization with ketamine and xylazine) placed on the microfluidic window (similar to that shown in FIG. 10) and covered with a heated blanket (not shown); (b) shows the epifluorescent image of nuclei prior to and several minutes after (c) DAPI (1 mg/ml) addition. The nuclei are now clearly fluorescent near the coverslip port.

FIG. 11 shows DAPI Staining Using Coverslip Microfluidics according to certain embodiments of the present invention, where (a) shows an anesthetized mouse (intraperitoneal anesthetization with ketamine and xylazine) placed on the microfluidic window (similar to that shown in FIG. 10) and covered with a heated blanket (not shown); (b) shows the epifluorescent image of nuclei prior to and several minutes after (c) DAPI (1 mg/ml) addition. The nuclei are now clearly fluorescent near the coverslip port. In other applications, the device may be used to grow cells (wild-type, mutant, or drug treated) in a bioreactor inside the coverslip microfluidics.

Having the ability to image through glass cover slips that have incorporated microfluidics will be a powerful tool for intravital imaging for biomedical and clinical studies. (Hak S, 2010; Weigert R., 2010.) Drug dosing, for example, is a critical issue for the efficacy of many cancer therapies. (Hochberg Y, 1987.) Furthermore, having the capacity to add controlled amounts of drugs or reagents to a localized area that is under observation in a living vertebrate will be extremely useful for the study of many processes such as the firing of neurons in the brain, the development of organs in the abdomen, or the recruitment of neutrophils to a site of infection. The system may allow the careful titration of vital dyes to optimize contrast in various tissues during imaging. While we can make submicron ports for setting up gradients, we can also make larger ports within a cover slip for the addition of various labeled cell types in order to watch their infiltration into an organ or tissue. Such a system will also allow the addition of controlled amounts of pathogens (bacterial or fungal) to visualize a site of infection and the immune response. In fact, gradients of chemoattractants could be setup on the inner side of the cover slip for the recruitment of specific cell types into the glass coverslip for further histochemical or proteomic analysis. These devices are extremely flexible and could support the addition of multiple ports or microfluidic channels for multiple simultaneous treatments. Providing drugs from two ports would produce a smooth gradient of the ratio of one drug to another, so that nonlinear double-dosage dependent effects could be studied.

Figure 12:
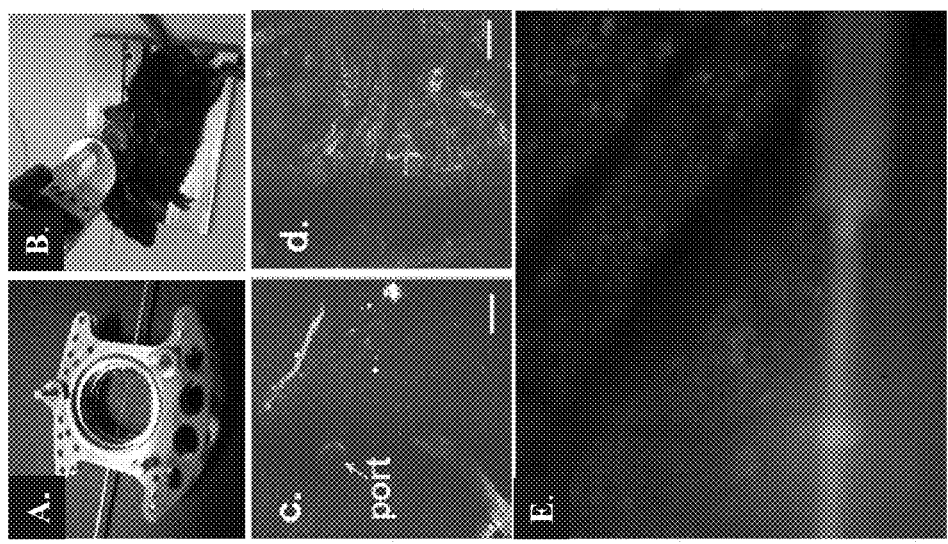
FIG. 12 shows Gradient generation using coverslip microfluidics according to certain embodiments of the present invention, where (a) shows skin flap device with single microfluidic channel that passes through the coverslip with surface ports on one side; (b) shows that once the skin flap device has been attached to the mouse, it is fitted into a stage and the skin is pushed down with the "tissue focalizer", a glass rod attached to a micrometer; (c) shows two photon image at a z-plane at the level of the port; (d) shows a focal plane a few microns deeper into the tissue and (e) shows that a FITC gradient could be generated through the 15 µm port and then visualized through epifluorescent microscopy.

FIG. 12 shows gradient generation using coverslip microfluidics according to certain embodiments of the present invention, where (a) shows skin flap device with single microfluidic channel that passes through the coverslip with surface ports on one side; (b) shows that once the skin flap device has been attached to the mouse, it is fitted into a stage and the skin is pushed down with the "tissue focalizer", a specialized device that allows light through, and brings the tissue into focus by gently adjusting a micrometer. This was critical as the mouse tissue is stretched out and does not necessarily lie in contact with the coverslip ports adjacent to the objective lens; (c) shows two photon image at a z-plane at the level of the port; (d) shows a focal plane a few microns deeper into the tissue and (e) shows that a FITC gradient could be generated through the 15 μm port and then visualized through epifluorescent microscopy. The red channel is a simultaneously acquired bright field image showing the mouse vasculature and tissue. In FIG. 12(d), the scale Bar is 50 μm. In FIG. 12(e), vasculature are imaged by bright field optics. Bar is approximately 50 μm. Ports can me made larger and could be used to perfuse in pathogens and drugs.

Figure 13:
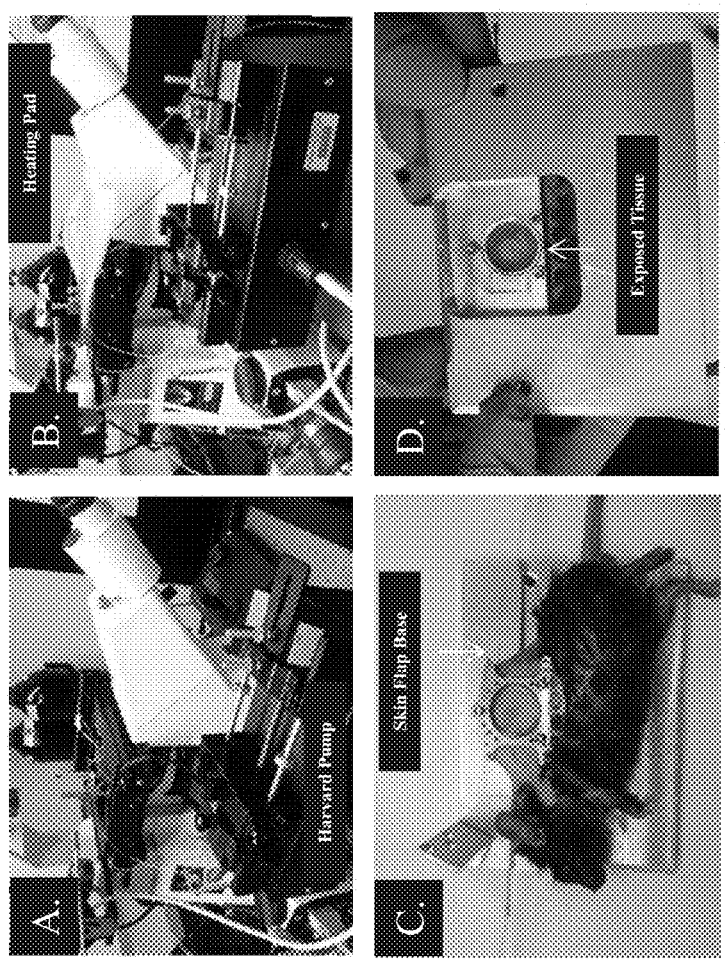
FIG. 13 shows the setup of the microscopy area before the start of the experiment according to certain embodiments of the present invention, where (a) shows the microfluidic plumping and the Harvard Pump apparatus which was used to inject the compound of interest; (b) shows that heating pad on top of mouse once the experiment has been started to keep the mouse at the appropriate body temperature; (c) shows a mouse attached to the device and placed on the stage; (d) shows the bottom of the stage and the exposed layer of skin from the mouse.

FIG. 13 shows the setup of the microscopy area before the start of the experiment according to certain embodiments of the present invention, where (a) shows the microfluidic plumping and the Harvard Pump apparatus which was used to inject the compound of interest; (b) shows that heating pad on top of mouse once the experiment has been started to keep the mouse at the appropriate body temperature; (c) shows a mouse attached to the device and placed on the stage; (d) shows the bottom of the stage and the exposed layer of skin from the mouse.

Figure 14:
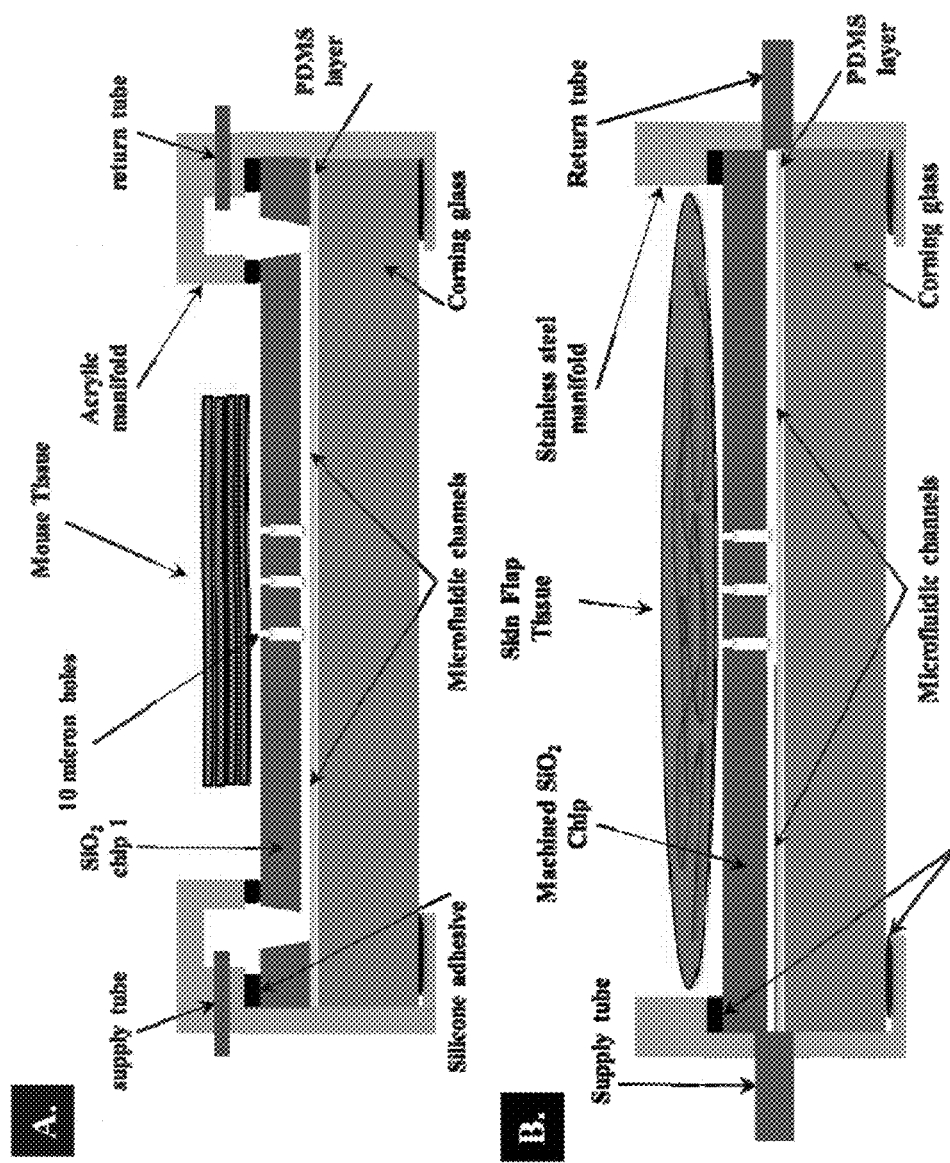
FIG. 14 shows (a) a microfluidic coverslip device as shown in FIG. 10 according to one embodiment of the present invention; and (b) the much smaller intravital skin flap device as shown in FIG. 13 according to one embodiment of the present invention.

FIG. 14 shows (a) a microfluidic coverslip device as shown in FIG. 10 according to one embodiment of the present invention; and (b) the much smaller intravital skin flap device as shown in FIG. 13 according to one embodiment of the present invention. As shown in FIG. 14(a), the large coverslip windows can be used alone, or inserted into a mouse imaging box.

Figure 15A:
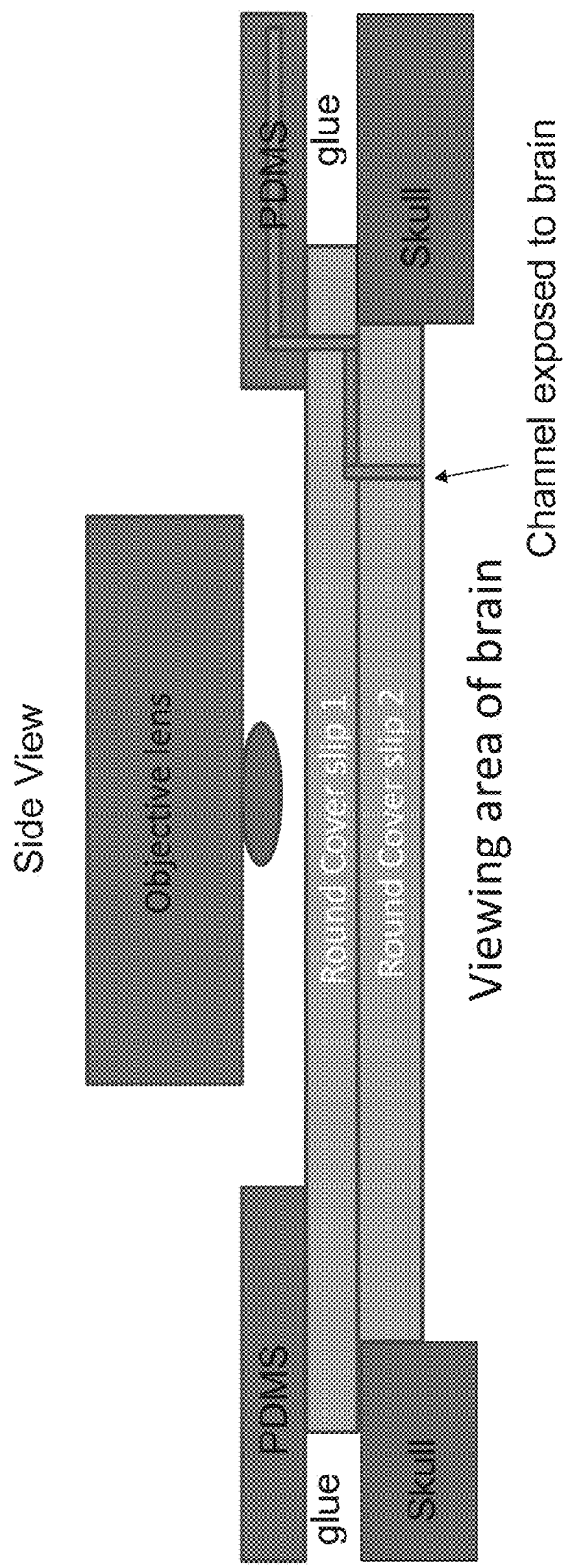
FIG. 15A shows a device according to one embodiment of the present invention, where the brain tissue is used as the tissue of the experimentation.
Figure 15B:
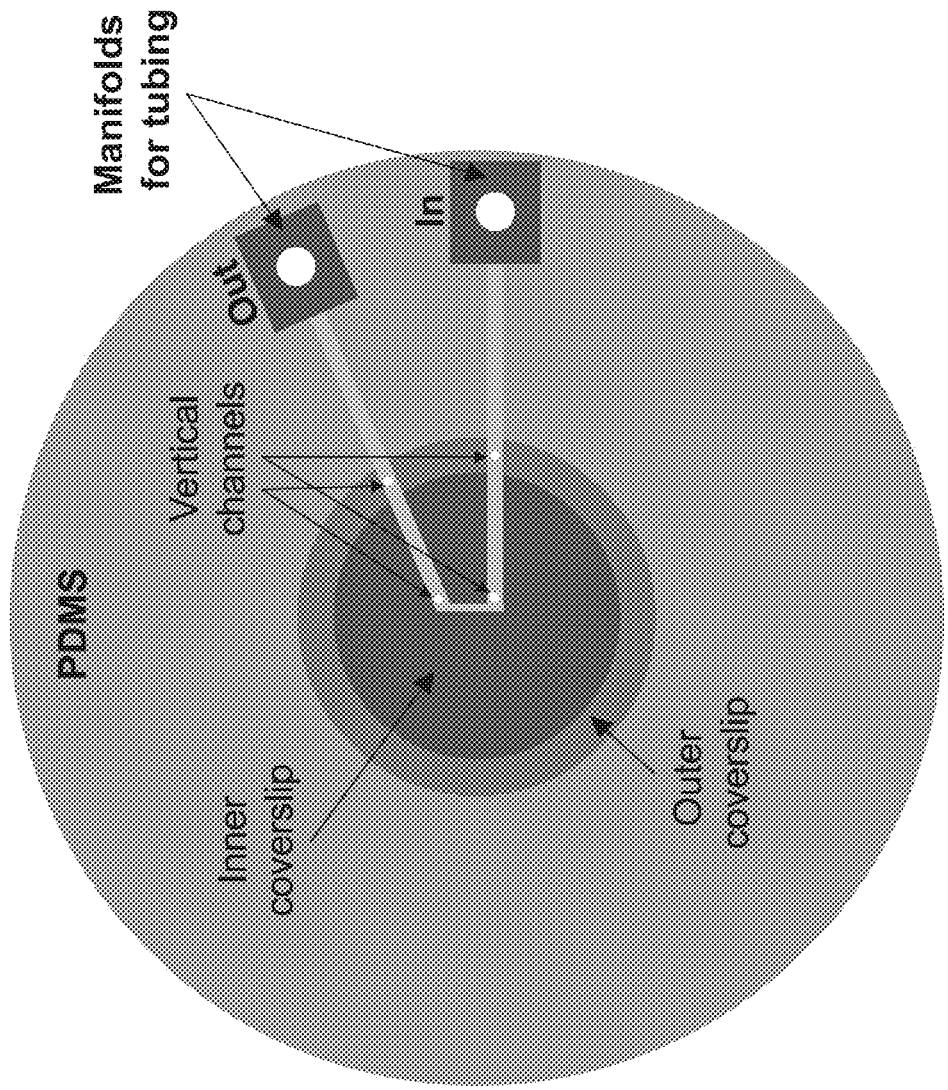
FIG. 15B shows a top view of the device as shown in FIG. 15A according to one embodiment of the present invention.

FIGS. 15A and 15B shows a further embodiment of the present invention, where the brain tissue is used as the tissue of the experimentation. FIG. 15A shows a side view of the device, and FIG. 15B shows a top view of the device. As shown in FIGS. 15A and 15B, round coverslip 1 (the outer coverslip) can be an $SiO_2$ chip between 4 and 8 mm, while round coverslip 2 (the inner coverslip) will be smaller and will be between 3 and 5 mm, depending on the animal that device is implanted in. It is clear that there is no way to image the brain (by fluorescence or bright field microscopy) and simultaneously add drugs or indicators in real time to a live animal. As shown in FIGS. 15A and 15B, the device is surgically implanted into the brain of a living animal for imaging layer 1 of the brain. Neuroscientists would be able to use the device to titrate in drugs, ligands, or calcium indicators and optogenetic probes. In certain embodiment, the device may be used for e.g. technology such as intravital microfluidics for real time manipulation and fluorescence imaging of the circuitry of the visual system. In other applications, the device may be used to actually grow cells (wild-type, mutant, or drug treated) in a bioreactor inside the coverslip microfluidics. This would allow one to put in specific cell types or mutant cell lines and watch them interact with the brain. In certain embodiments, the device may be used for potentially porting in cold buffer when the animal was not under the microscope to prevent local wound healing responses. This would prevent cell growth and potential clogging for long term imaging (weeks).

In certain embodiments, a probe may be incorporated to image the outer layers with microscopy, but also monitor action potentials of deeper layers (with the probes). These probes could also have microfluidics.

Figure 16:
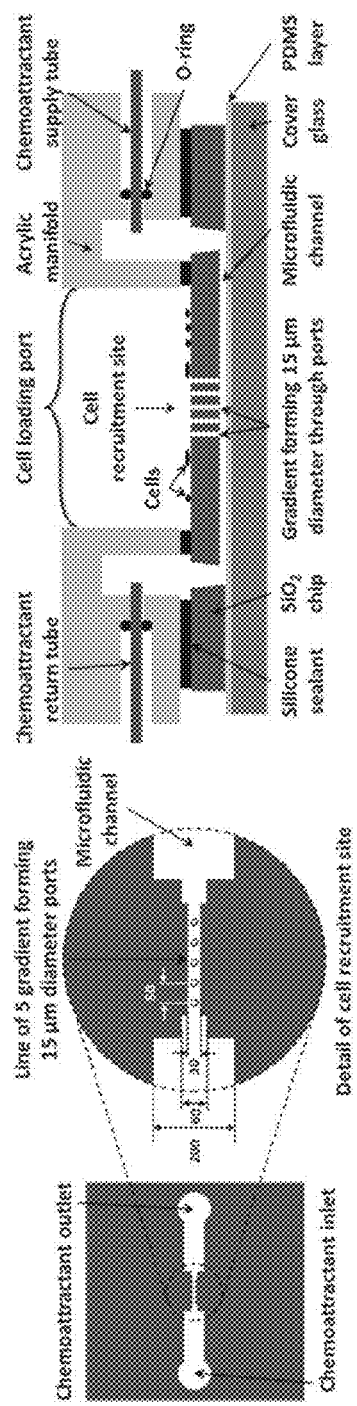
FIG. 16 shows a MALDI device according to one embodiment of the present invention.
Figure 17:
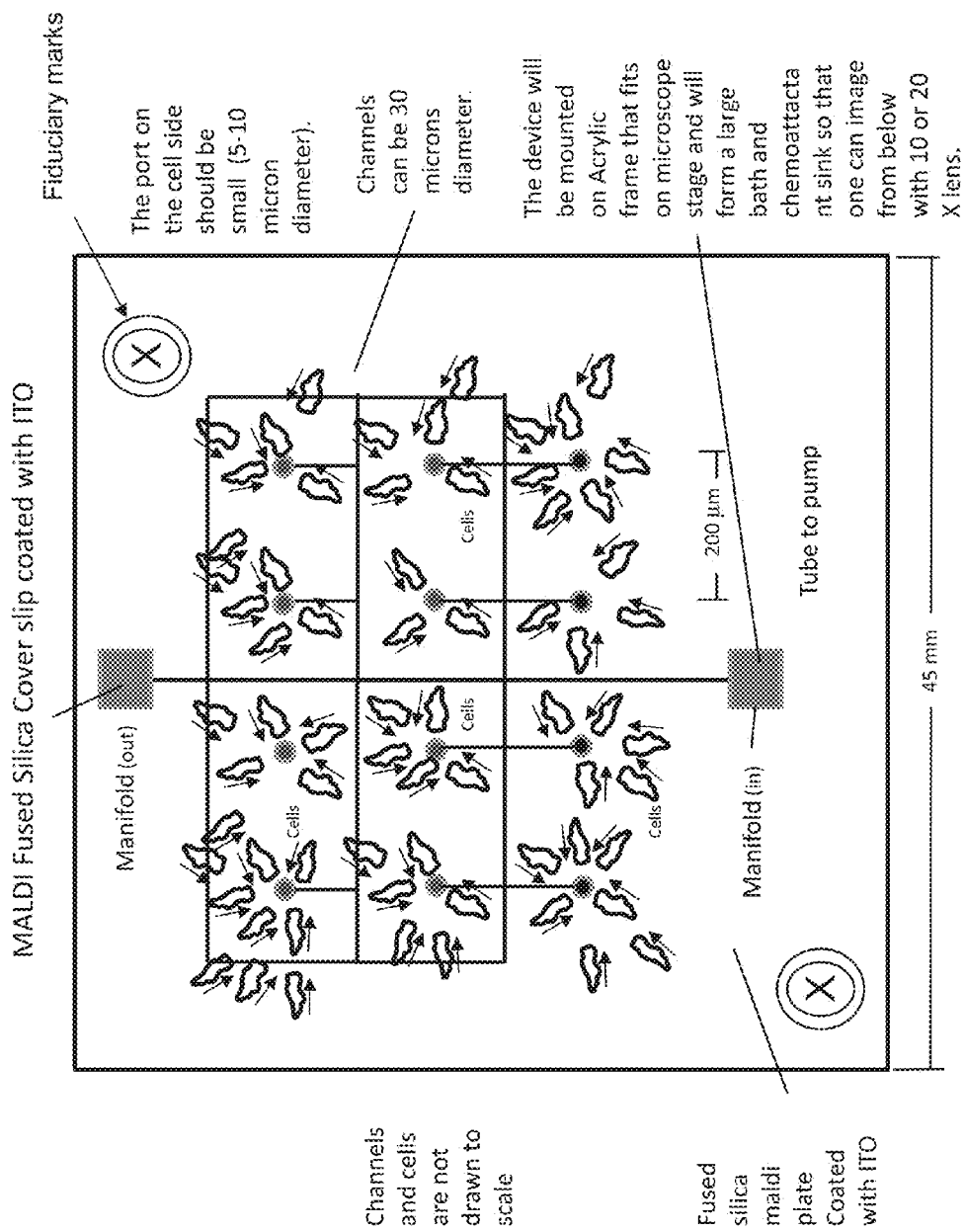
FIG. 17 shows a MALDI fused silica cover slip coated with ITO according to one embodiment of the present invention.

FIG. 16 shows a MALDI device according to one embodiment of the present invention. FIG. 17 shows a MALDI fused silica cover slip coated with ITO according to one embodiment of the present invention. Migratory eukaryotic cells can be oriented on the MALDI device so that they develop a distinct front and back, imaged by bright field and fluorescence microscopy, and then rapidly fixed or frozen. The fronts and backs of cells then can be selectively ionized in a mass spectrometer. The device may be used for imaging parts of cell in a mass spectrometer. The cells migrate towards a chemical gradient elicited from ports in the MALDI chip itself. The cells would then be imaged on a microscope. The cells are then rapidly frozen or fixed and the MALDI chip is put in a mass spectrometer. By using fiduciary marks, the locations of the cells may be located, and then be ionized to the fronts or rears of hundreds of cells simultaneously (increasing signal to noise) to determine what proteins or other molecules were in the front or back of a cell. The etching of fiduciary marks on the MALDI chip could also be useful in the absence of microfluidics. As an example, cells at a certain phase of the cell cycle (at metaphase, for instance) could be scored on the light or fluorescent microscope. Their position could be determined relative to the fiduciary marks (which can be seen with low magnification optics in the mass spectrometer). Single or multiple cells could then be ionized in the mass spectrometer without actually having the capacity to visualize them.

Figure 18:
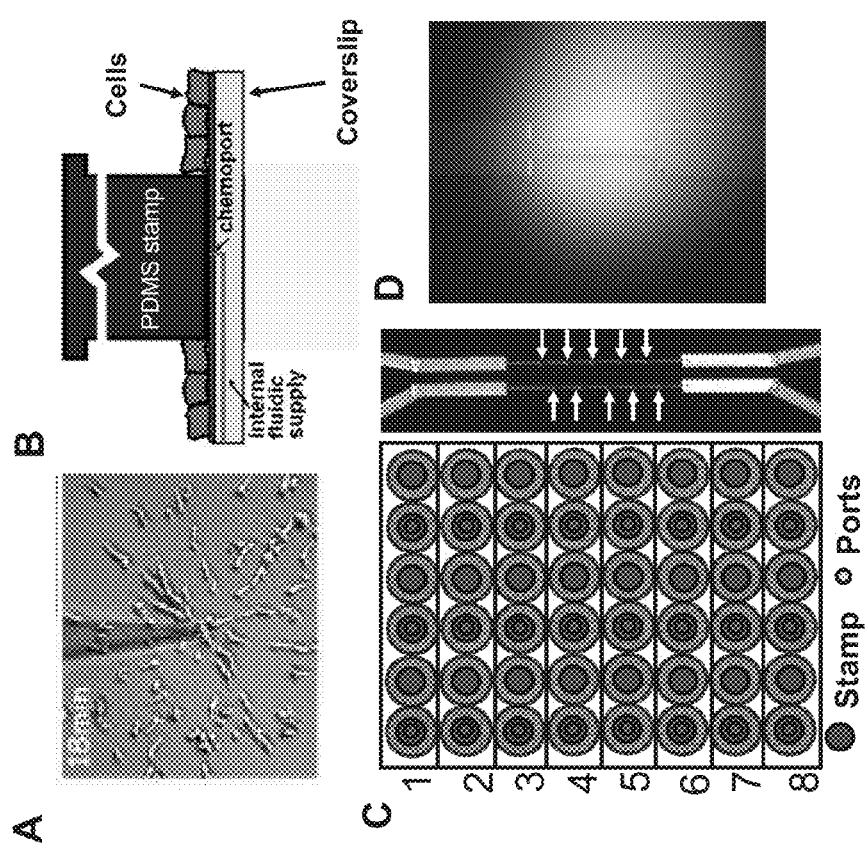
FIG. 18 shows a high throughout (HTP) chemotaxis device for screening of drugs, ligands, orphan receptors and mutants according to one embodiment of the present invention.

FIG. 18 shows a high throughout (HTP) chemotaxis device for screening of drugs, ligands, orphan receptors and mutants according to one embodiment of the present invention. A) Typical assay using a micropipette with 1 mm cAMP for 18 minutes is labor intensive and not useful for HTP. B) In this embodiment of the present invention, we will use PDMS stamps to pattern our cells over the chemoports etched in the coverslip glass. A passive gradient of chemoattractant will emanate and remain stable for several hours (the wells will provide a huge sink for these 5 micron holes that will be under gentle positive pressure). C) Left-cartoon of high throughput device from above. Each row will permit the simultaneous testing of one mutant or drug to a gradient or to random motility in triplicates (altered between random migration and chemotaxis). The stamps will pattern the cells at time zero and then be removed for the duration of the experiment (1 hr). Cells will be scored by microscopy and their ability to move towards the port (and up the concentration gradient) Right-inset of two channels with 5 ports (arrows) in a 2×3 inch coverslip, as shown for the intravital imaging coverslip. The large channels are 50 μm. D) FITC gradient produced from five, 15 μm coverslip ports, demonstrating that gradients can easily be achieved. As shown in FIG. 18(A), typical assay using a micropipette with 1 mm cAMP for 18 minutes is labor intensive and not useful for HTP. FIG. 18(B) shows that PDMS stamps are used to pattern cells over the chemoports etched in the coverslip glass. In this embodiment of the present invention, the inventors use PDMS stamps to pattern cells over the chemoports etched in the coverslip glass. A passive gradient of chemoattractant will emanate and remain stable for several hours (the wells will provide a huge sink for these 5 micron holes that will not be under pressure). FIG. 18(C) includes left and right parts of the figures. The lef part of FIG. 18(C) shows a cartoon of high throughput device. Each row will permit the simultaneous testing of one mutant or drug to a gradient or to random motility in triplicates (altered between random migration and chemotaxis). The stamps will pattern the cells at time zero and then be removed for the duration of the experiment (1 hr). The stamps will pattern the cells, but will also act as a valve and block the release of chemicals from the ports until the onset of the experiment. Cells will be scored by microscopy and their ability to move towards (or away) from the port (and up or down the concentration gradient) The right part of FIG. 18(C) shows the inset of two channels with 5 ports (arrows) in a 2×3 inch coverslip. The large channels are 50 μm. FIG. 18(D) shows FITC gradient produced from five, 10 μm coverslip ports, demonstrating that gradients can easily be achieved.

As discussed above, the stamps are used for physically preventing cells from adhering to the area around the chemoattractant port in the coverslip, and physically preventing the chemoattractant, drug, or ligand from coming out of the coverslip port. In certain embodiments, however, the stamp array may not be necessary if the microfluidics are controlled by patterning the substrate so that the area around the ports is nonadhesive. For example, it may be feasible to photocleave a linker and add fibronectin, and the area around the coverslip would become adhesive. Thus, the cells may respond to the chemical or drug treatment.

In summary, microfluidic devices can provide unique control over both the chemoattractant gradient and the migration environment of the cells. Based on the work of the inventors, laser-machined micro and nanofluidic channels are incorporated into bulk fused silica and cover slip-sized silica wafers. The inventors thus have designed "open" chemotaxis devices that produce passive chemoattractant gradients without an external micropipette system. Since the migration area is unobstructed, cells can be easily loaded and strategically placed into the devices with a standard micropipette. The reusable monolithic glass devices have integral ports that can generate multiple gradients in a single experiment. The inventors have also used cover slip microfluidics for chemotaxis assays. Passive gradients elicited from these cover slips could be readily adapted for high throughput chemotaxis assays. The inventors have also demonstrated for the first time that cells can be recruited into cover slip ports eliciting passive chemoattractant gradients. This proves, in principle, that intravital cover slip configurations could deliver controlled amounts of drugs, chemicals or pathogens as well as recruit cells for proteomic or histological analysis in living animals while under microscopic observation. Intravital cover slip fluidics will create a new paradigm for in vivo observation of biological processes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LISTING OF REFERENCES

ABHYANKAR, V. V., LOKUTA, M. A., HUTTENLOCHER, A. & BEEBE, D. J. (2006). Characterization of a membrane-based gradient generator for use in cell-signaling studies. Lab Chip 6(3), 389-393.

ANDERSSON, H. & VAN DEN BERG, A. (2003). Microfluidic devices for cellomics: a review. Sensors and Actuators B-Chemical 92(3), 315-325.

BOYDEN, S. (1962). The chemotactic effect of mixtures of antibody and antigen on polymorphonuclear leucocytes. J. Exp. Med. 115, 453-466.

BUNNING, E. (1989). *Ahead of his time: Wilhelm Pfeffer*. Ottawa, Ontario, Canada.: Carlton University Press.

BUTLER, K. L. A., V. AGRAWAL, N. BILODEAU, M. TONER, M. TOMPKINS, R. G. FAGAN, S. IRIMIA, D. (2010). Burn Injury Reduces Neutrophil Directional Migration Speed in Microfluidic Devices. PLoS One 5(7), e11921.

CONDEELIS, J., SINGER, R. H. & SEGALL, J. E. (2005). The great escape: when cancer cells hijack the genes for chemotaxis and motility. Annu Rev Cell Dev Biol 21, 695-718.

COSTA, L. T., A. RAJPUT, D. HOFMEISTER, W. JOWHAR, D. WRIGHT, G. JANETOPOULOS, C. (2011). Femtosecond laser machined microfluidic devices for imaging of cells during chemotaxis. Journal of Laser Applications 23(4), 042001-042006.

CUKIERMAN, E., PANKOV, R., STEVENS, D. R. & YAMADA, K. M. (2001). Taking cell-matrix adhesions to the third dimension. Science 294(5547), 1708-1712.

DE PAEPE, B., CREUS, K. K. & DE BLEECKER, J. L. (2009). Role of cytokines and chemokines in idiopathic inflammatory myopathies. Curr Opin Rheumatol 21(6), 610-616.

DIMOV I K, K. G., PARK Y, DUCREE J, KANG T, LEE L P. (2011). Integrated microfluidic array plate (iMAP) for cellular and molecular analysis. Lab Chip 11(16), 2701-2710.

DORSAM, R. T. & GUTKIND, J. S. (2007). G-protein-coupled receptors and cancer. Nat Rev Cancer 7(2), 79-94.

EL-ALI, J., SORGER, P. K. & JENSEN, K. F. (2006). Cells on chips. Nature 442(7101), 403-411.

ENGLERT D L, Manson M D, JAYARAMAN A. (2009). Flow-based microfluidic device for quantifying bacterial chemotaxis in stable, competing gradients. Appl Environ Microbiol 75(13), 4557-4564.

GRILL, S. W., HOWARD, J., SCHAFFER, E., STELZER, E. H. & HYMAN, A. A. (2003). The distribution of active force generators controls mitotic spindle position. Science 301 (5632), 518-521.

HAK S, R. N., HARALDSETH O, DELANGE DAVIES C. (2010). Intravitreal microscopy in window chambers: a unique tool to study tumor angiogenesis and delivery of nanoparticles. Angiogenesis 13(2), 113-130.

HANSSON, G. K. (2009). Inflammatory mechanisms in atherosclerosis. J Thromb Haemost 7 Suppl 1, 328-331.

HEGERFELDT, Y., TUSCH, M., BROCKER, E. B. & FRIEDL, P. (2002). Collective cell movement in primary melanoma explants: Plasticity of cell-cell interaction, ss 1-integrin function, and migration strategies. Cancer Res 62(7), 2125-2130.

HOCHBERG Y, T. A. (1987). *Multiple comparison procedures*. New York: Wiley.

JOHNSON, Z., POWER, C. A., WEISS, C., RINTELEN, F., JI, H., RUCKLE, T., CAMPS, M., WELLS, T. N., SCHWARZ, M. K., PROUDFOOT, A. E. & ROMMEL, C. (2004). Chemokine inhibition—why, when, where, which and how? Biochem Soc Trans 32(Pt 2), 366-377.

JOWHAR, D., WRIGHT, G., SAMSON, P. C., WIKSWO, J. P. & JANETOPOULOS, C. (2010). Open access microfluidic device for the study of cell migration during chemotaxis. Integr Biol (Camb) 2(11-12), 648-658.

KE, K., HASSELBRINK, E. F. & HUNT, A. J. (2005). Rapidly Prototyped Three-Dimensional Nanofluidic Channel Networks in Glass Substrates. Anal. Chem 77, 5083-5088.

KE, K., HASSELBRINK, E. F., HUNT, A. J. (2005). Rapidly prototyped three-dimensional nanofluidic channel networks in glass substrates. Analytical Chemistry 77(16), 5083-5088.

KEENAN T M, F. C., WU A, WONG V, FOLCH A. (2010). A new method for studying gradient-induced neutrophil desensitization based on an openmicrofluidic chamber. Lab Chip 10(1), 116-122.

KEENAN, T. M. & FOLCH, A. (2008). Biomolecular gradients in cell culture systems. Lab on a Chip 8(1), 34-57.

KIM, M., HWANG, D. J., JEON, H., HIROMATSU, K. & GRIGOROPOULOS, C. P. (2009). Single cell detection using a glass-based optofluidic device fabricated by femtosecond laser pulses. Lab on a Chip 9(2), 311-318.

KIM, S. K., H J. JEON, N L. (2010). Biological applications of microfluidic gradient devices. Integrative Biol. 2, 584-603.

KNIGHT, B., LAUKAITIS, C., AKHTAR, N., HOTCHIN, N. A., EDLUND, M. & HORWITZ, A. R. (2000). Visualizing muscle cell migration in situ. Curr Biol 10(10), 576-585.

LAUFFENBURGER, D., ROTHMAN, C. & ZIGMOND, S. H. (1983). Measurement Of leukocyte motility and chemotaxis parameters with a linear under-agarose migration assay. J Immunol 131(2), 940-947.

LAZENNEC, G. & RICHMOND, A. (2010). Chemokines and chemokine receptors: new insights into cancer-related inflammation. Trends in Molecular Medicine 16(3), 133-144.

LI JEON, N. B., H. DERTINGER, S. K. W. WHITESIDES, G. M. VAN DE WATER, L. TONER M. (2002). Neutrophil chemotaxis in linear and complex gradients of interleukin-8 formed in a microfabricated device. Nat Biotechnol 20, 826-830.

LI X, L. L., WANG L, KAMEI K, YUAN Q, ZHANG F, SHI J, KUSUMI A, XIE M, ZHAO Z, CHEN Y. (2011). Integrated and diffusion-based mico-injectors for open access cell assays. Lab Chip 11(15), 2612-2617.

LO J F, S. E., EDDINGTON D T. (2010). Oxygen gradients for open well cellular cultures via microfluidic substrates. Lab Chip 10(18), 2394-2401.

LOVCHIK RD, B. F., TONNA N, RUIZ A, MATTEOLI M, DELAMARCHE E. (2010). Overflow microfluidic networks for open and closed cell cultures on chip. Anal Chem 82(9), 3936-3942.

MELIN, J. & QUAKE, S. R. (2007). Microfluidic large-scale integration: The evolution of design rules for biological automation. Annu. Rev. Biophys. Biomolec. Struct. 36, 213-231.

MULLER-TAUBENBERGER, A. (2006). Application of fluorescent protein tags as reporters in live-cell imaging studies. Meth. Mol. Biol. 346, 229-246.

PARENT, C. A., BLACKLOCK, B. J., FROEHLICH, W. M., MURPHY, D. B. & DEVREOTES, P. N. (1998). G protein signaling events are activated at the leading edge of chemotactic cells. Cell 95(1), 81-91.

POSTMA, M. & VAN HAASTERT, P. (2009). Mathematics of experimentally generated chemoattractant gradients. Meth Mol Biol 571, 473-488.

RAJA, W. K., GLIGORIJEVIC, B., WYCKOFF, J., CONDEELIS, J. S. & CASTRACANE, J. (2010). A new chemotaxis device for cell migration studies. Integrative Biology 2(11-12), 696-706.

SASAKI, A., CHUN, C., TAKEDA, K. & FIRTEL, R. (2004). Localized Ras signaling at the leading edge regulates PI3K, cell polarity, and directional cell movement. J Cell Biol 167(3), 505-518.

SASAKI, A. T. & FIRTEL, R. A. (2009). Spatiotemporal Regulation of Ras-GTPases During Chemotaxis. Meth Mol Biol 571, 333-348.

TAYLOR, A. M. B.-J., M. WOO RHEE, S. CRIBBS, D. H. COTMAN, C. W. LI JEONG, N. (2005). A Microfluidic Culture Platform for CNS Axonal Injury, Regeneration and Transport. Nat. Methods 2(8), 599-605.

WALKER G M, S. J., RICHMOND A, STREMLER M, CHUNG C Y, WIKSWO J P. (2005). Effects of flow and diffusion on chemotaxis studies in a microfabricated gradient generator. Lab Chip 5(6), 611-618.

WEIGERT R., S. M., AMORNPHIMOLTHAM P., PARENTE L., MASEDUNSKAS A. (2010). Intravital microscopy as a novel tool to study cell biology in live animals. Histochemistry and cell biology 133(5), 481-491.

WHITE, Y., LI, X., SIKORSKI, Z., DAVIS, L. M. & HOFMEISTER, W. (2008). Single-pulse ultrafast-laser machining of high aspect nano-holes at the surface of $SiO_2$. Optics Express 16(18), 4411-14420.

Whitesides, G. M. (2006). The origins and the future of microfluidics. Nature 442(7101), 368-373.

Wolf, K., Mazo, I., Leung, H., Engelke, K., von Andrian, U. H., Deryugina, E. I., Strongin, A. Y., Brocker, E. B. & Friedl, P. (2003). Compensation mechanism in tumor cell migration: mesenchymal-amoeboid transition after blocking of pericellular proteolysis. J Cell Biol 160(2), 267-277.

Wu, X., Lee, V. C., Chevalier, E. & Hwang, S. T. (2009). Chemokine receptors as targets for cancer therapy. Curr Pharm Des 15(7), 742-757.

Young E, B. D. (2010). Fundamentals of microfluidic cell culture in controlled microenvironments. Chem. Soc. Rev 39, 1036-1048.

Zalloum, O. H. Y., Parrish, M., Terekhov, A., Hofmeister, W. (2010). An amplified femtosecond laser system for material micro-=nanostructuring with an integrated Raman microscope. Review of Scientific Instruments 81.

Zicha D., D. G., and Jones G. (1997). Analyzing chemotaxis using the Dunn direct-viewing chamber. Methods Mol Biol 75, 449-457.

Zigmond, S. (1977). Ability of Polymorphonuclear Leudocytes to Orient in Gradients of Chemotactic Factors. J Cell Biol 75(2), 606-616.

What is claimed is:

1. An on-chip open microfluidic device, comprising:
   (a) a substrate;
   (b) a polydimethyl-siloxane (PDMS) layer disposed on the substrate;
   (c) a silica (SiO$_2$) chip positioned within a distance from the PDMS layer and comprising a cell loading portion,
   (d) a channel comprising and first and second end formed between and contacting the silica chip and the PDMS layer; and
   (e) plurality of ports in the SiO$_2$ chip that connect the microfluidic channel to the cell loading portion;
   (f) an inlet at the first end of the channel and an outlet at the second end of the channel channel;
   (g) a chemoattractant supply device connected to the inlet; and
   (h) an imaging device configured to capture an image of the tissue to observe cell migration of the tissue;
   wherein:
   the supply device supplies a solution comprising a chemoattractant through the inlet into the microfluidic channel; and, the chemoattractant enters the cell loading portion from the microfluidic channel through the ports.

2. The device of claim 1, wherein the the chemoattractant solution flows out from the microfluidic channel through the outlet.

3. The device of claim 1, wherein the chemoattractant cyclic adenosine monophosphate (cAMP).

4. The device of claim 1, wherein the PDMS coating layer has a thickness of about 20 µm, and the silica chip has a thickness of about 500 µm.

5. The device of claim 1, wherein each of the gradient generating ports has a size of about 2.0 to 18.0 µm.

6. The device of claim 1, wherein each of the gradient generating ports extends along a direction substantially perpendicular to the microfluidic channel.

7. The device of claim 1, wherein each of the gradient generating ports extends along a direction substantially parallel to the microfluidic channel.

8. The device of claim 1, wherein the imaging device comprises an objective lens.

9. The device of claim 1, wherein the cell loading portion comprises tissue comprises body tissues in or on a living object.

10. The device of claim 9, wherein the tissue comprises brain tissues of the living object.

11. The device of claim 9, wherein the tissue comprises *Dictyostelium discoideum* amoebae.

12. The device of claim 1, wherein the tissue comprises resected tissues of a living object.

13. A chemotaxis apparatus, comprising device of claim 1.

14. The chemotaxis apparatus of claim 13, being a high throughput (HTP) chemotaxis device for screening of drugs, ligands, orphan receptors and mutants.

15. The chemotaxis apparatus of claim 13 further comprising a stamp over at least one of the holes in the in the SiO$_2$ chip.

* * * * *